United States Patent
Sjögren et al.

(10) Patent No.: US 12,086,701 B2
(45) Date of Patent: *Sep. 10, 2024

(54) COMPUTER-IMPLEMENTED METHOD, COMPUTER PROGRAM PRODUCT AND SYSTEM FOR ANOMALY DETECTION AND/OR PREDICTIVE MAINTENANCE

(71) Applicant: SARTORIUS STEDIM DATA ANALYTICS AB, Umeå (SE)

(72) Inventors: Rickard Sjögren, Umeå (SE); Johan Trygg, Umeå (SE)

(73) Assignee: SARTORIUS STEDIM DATA ANALYTICS AB, Umeå (SE)

( * ) Notice: Subject to any disclaimer, the term of this patent is extended or adjusted under 35 U.S.C. 154(b) by 827 days.

This patent is subject to a terminal disclaimer.

(21) Appl. No.: 17/273,709

(22) PCT Filed: Sep. 5, 2019

(86) PCT No.: PCT/EP2019/073670
§ 371 (c)(1),
(2) Date: Mar. 4, 2021

(87) PCT Pub. No.: WO2020/049087
PCT Pub. Date: Mar. 12, 2020

(65) Prior Publication Data
US 2021/0334656 A1    Oct. 28, 2021

(30) Foreign Application Priority Data

Sep. 5, 2018 (EP) .................................. 18192649
Jun. 18, 2019 (EP) .................................. 19180972

(51) Int. Cl.
*G06N 3/04* (2023.01)
*G06F 18/213* (2023.01)
(Continued)

(52) U.S. Cl.
CPC ............. *G06N 3/04* (2013.01); *G06F 18/213* (2023.01); *G06F 18/22* (2023.01); *G06N 3/048* (2023.01); *G06N 3/08* (2013.01); *G06V 20/698* (2022.01)

(58) Field of Classification Search
CPC ............ G06N 3/04; G06N 3/048; G06N 3/08; G06N 3/088; G06N 3/0442; G06N 3/0455;
(Continued)

(56) References Cited

U.S. PATENT DOCUMENTS 10,229,356 B1 * 3/2019 Liu .......................... G10L 15/16
10,997,499 B1    5/2021 Kayyoor et al.
(Continued)

FOREIGN PATENT DOCUMENTS

CN    104881684    9/2015
CN    107655850    2/2018
(Continued)

OTHER PUBLICATIONS

Bishop, "Latent Variable Models," 1999, Learning in Graphical Models, M.I. Jordan (Ed), MIT Press, pp. 371-403.
(Continued)

*Primary Examiner* — Bobbak Safaipour
(74) *Attorney, Agent, or Firm* — Klarquist Sparkman, LLP

(57) ABSTRACT

An example method comprises receiving a new observation characterizing at least one parameter of an entity; inputting the new observation to a deep neural network having hidden layers; obtaining a second set of intermediate output values that are output from at least one of the hidden layers by inputting the received new observation to the deep neural network; mapping the second set of intermediate output values to a second set of projected values; determining whether or not the received new observation is an outlier
(Continued)

with respect to the training dataset based on the latent variable model and the second set of projected values, calculating a prediction for the new observation; and determining a result indicative of the occurrence of at least one anomaly in the entity based on the prediction and the determination whether or not the new observation is an outlier.

15 Claims, 9 Drawing Sheets

(51) Int. Cl.
    *G06F 18/22*     (2023.01)
    *G06N 3/048*     (2023.01)
    *G06N 3/08*     (2023.01)
    *G06V 20/69*     (2022.01)

(58) Field of Classification Search
    CPC .... G06N 3/0464; G06N 3/092; G06F 18/213; G06F 18/22; G06V 20/698; G05B 23/024
    See application file for complete search history.

(56) References Cited

U.S. PATENT DOCUMENTS

| | | | |
|---|---|---|---|
| 11,062,229 | B1 | 7/2021 | Mnih et al. |
| 11,868,887 | B2* | 1/2024 | Kandemir ............... G06N 3/08 |
| 2013/0338965 | A1 | 12/2013 | Ide et al. |
| 2013/0339202 | A1 | 12/2013 | Zhao et al. |
| 2014/0365195 | A1 | 12/2014 | Lahiri et al. |
| 2016/0063393 | A1 | 3/2016 | Ramage et al. |
| 2019/0287230 | A1 | 9/2019 | Lu et al. |
| 2020/0020098 | A1 | 1/2020 | Odry et al. |
| 2020/0074269 | A1* | 3/2020 | Trygg ............... G06V 10/761 |
| 2021/0011791 | A1* | 1/2021 | Okanohara ............ G06N 7/01 |
| 2021/0041953 | A1 | 2/2021 | Poltorak |
| 2021/0350113 | A1 | 11/2021 | Sjögren et al. |

FOREIGN PATENT DOCUMENTS

| | | |
|---|---|---|
| CN | 107967515 | 4/2018 |
| CN | 108445752 | 8/2018 |
| KR | 10-2018-0064905 | 6/2018 |
| WO | WO 97/06418 | 2/1997 |

OTHER PUBLICATIONS

Mandal, "Implementing PCA, Feedforward and Convolutional Autoencoders and using it for Image Reconstruction, Retrieval & Compression," Jan. 9, 2018, Manash's Blog, retrieved from: https://blog.manash.io/implementing-pca-feedforward-and-convulutional-autoencoders-and-using-it-for-image-reconstruction.
International Search Report received in PCT/EP2019/073695, Dec. 4, 2019, 3 pages.
Written Opinion received in PCT/EP2019/073695, Dec. 4, 2019, 5 pages.
"Bayesian Uncertainty Estimation for Batch Normalized Deep Networks," under review as conference paper at ICLR 2018, Feb. 2018, 27 pages.
Ilg et al., "Uncertainty Estimates and Multi-Hypotheses Networks for Optical Flow," arXiv:1802.07095v4 [cs.CV] Dec. 20, 2018, 30 pages.
Gal et al., "Dropout as a Bayesian Approximation: Representing Model Uncertainty in Deep Learning," Proceedings of the 33$^{rd}$ International Conference on Machine Learning, New York, NY, 2016, 12 pages.
Blundell et al., "Weight Uncertainty in Neural Networks," Proceedings of the 32$^{nd}$ International Conference on Machine Learning, Lille, France, 2015, 10 pages.
Lakshminarayanan et al., "Simple and Scalable Predictive Uncertainty Estimation using Deep Ensembles," 31$^{st}$ Conference on Neural Information Processing Systems, Long Beach, CA, Nov. 4, 2017, 15 pages.
Saxena et al., "Damage Propagation Modeling for Aircraft Engine Run-to-Failure Simulation," 2008 International Conference on Prognostics and Health Management, Oct. 2008, 10 pages.
Hochreiter et al., "Long Short-Term Memory," Neural Computation 9(8): 1997, pp. 1735-1780.
Gers et al., "Learning to Forget: Continual Prediction with LSTM," Neural Computation, 12, (2000), pp. 2451-2471, (70 pages w/citations).
Kingma et al., "ADAM: A Method for Stochastic Optimization," published as conference paper at ICLR 2015, pp. 1-15.
Latecki et al., "Outlier Detection with Kernel Density Functions," Machine Learning and Data Mining in Pattern Recognition, Jul. 2007, pp. 61-75.
Osband et al., "Deep Exploration via Bootstrapped DQN," Advances in Neural Information Processing Systems, Jul. 2016, pp. 4026-4034.
Ritter et al., "A Scalable Laplace Approximation for Neural Networks," published as a conference paper at ICLR 2018, Feb. 2018, 15 pages.
Jenatton et al., "Structured Sparse Principal Component Analysis," appearing in Proceedings of the 13$^{th}$ International Conference on Artificial Intelligence and Statistics, vol. 9, Mar. 2010, 8 pages.
Kingma et al., "Auto-Encoding Variational Bayes," ARXIV Preprint, ARXIV: 1312.6114, 2103, May 2014, 14 pages.
Makhzani et al., "k-Sparse Autoencoders," International Conference on Learning Representations, ICLR Mar. 2014, 9 pages.
Li et al., "Transforming Cooling Optimization for Green Data Center via Deep Reinforcement Learning," arXiv:1709.050774v4 [cs.AI] Jul. 2018, 11 pages.
Dasgupta, "Experiments with Random Projection," Uncertainty in Artificial Intelligence Proceedings 2000, Jun. 2000, pp. 143-151.
Lazarevic et al., "Feature Bagging for Outlier Detection," KDD '05, Aug. 21-24, 2005, Chicago, IL, pp. 157-166.
Wold et al., "PLS-regression: a basic tool of chemometrics," Chemometrics and Intelligent Laboratory Systems, 58(2001), pp. 109-130.
Xiao et al., "Fashion-MNIST: a Novel Image Dataset for Benchmarking Machine Learning Algorithms," https://trends.google.com/trends/explore?data-all&q=mnist,CIFAR,imageNet, Aug. 2017, 6 pages.
LeCun et al., "The MNIST Database of handwritten digits," Jun. 21, 2018, 9 pages., http://yann.lecun.com/exdb/mnist.
Rousseeuw, "Least Median of Squares Regression," Journal of the American Statistical Association, vol. 79, No. 388, Dec. 1984, pp. 871-880.
Rousseeuw, "Multivariate Estimation with High Breakdown Point," Mathematical Statistics and Applications (1985) pp. 283-297.
Deng et al., "ImageNet: A Large Scale Hierarchical Image Database," 2009 IEEE Conference on Computer Vision and Pattern Recognition, 2009, pp. 248-255.
Szegedy et al., "Rethinking the Inception Architecture for Computer Vision," Proceedings of the IEEE Conference on Computer Vision and Pattern Recognition, 2016, pp. 2818-2826.
Lin et al., "Network in Network," arXiv1 3124400 CS, Dec. 2013, pp. 1-10.
Achlioptas, "Database-friendly random projections: Johnson-Lindenstrauss with binary coins," Journal of Computer and System Sciences 66 (2003) pp. 671-687.
Wold," Principal Component Analysis," Chomometrics and intelligent Laboratory Systems, vol. 2, No. 1 (1987) pp. 37-52.
Breunig et al., "LOF: Identifying Density-Based Local Outliers," Proceedings of the 2000 ACM SIGMOD International Conference on Management of Data, 2000, pp. 93-104.
Liu et al., "Neural Networks with Enhanced Outlier Rejection Ability for Off-Line Handwritten Word Recognition," 2002, Pattern Recognition 35, 11 pages.
Goldberger et al., "Neighborhood Component Analysis," 2004, Advances in Neural Information Processing Systems 17, 8 pages.

(56) References Cited

OTHER PUBLICATIONS

Said et al., "Data Preprocessing for Distance-based Unsupervised Intrusion Detection," 2011, $9^{th}$ Annual International Conference on Privacy, Security and Trust, 8 pages.
Yu et al., Recursive Principal Component Analysis-Based Data Outlier Detection and Sensor Data Aggregation in IoT Systems, 2017, IEEE Internet of Things Journal, vol. 4, No. 6, 10 pages.
Guo et al., "An Anomaly Detection Framework Based on Autoencoder and Nearest Neighbor," Jul. 2018, $15^{th}$ International Conference on Service Systems and Service Management, 6 pages.
Office Action (w/English translation) received in related Japan Application No. 2021-512919, mailed on Jul. 26, 2022, 8 pages.
Dewa Made Sri Arsa et al., "Improving Principal Component Analysis Performance for Reducing Spectral Dimension in Hyperspectral Image Classification," 2018 International Workshop on Big Data and Information Security (IWBIS) IEEE, May 13, 2018, pp. 123-128, 6 pages.
Office Action (w/o English translation) issued in Chinese Application No. 201980058094.9, Sep. 23, 2023, 7 pages.
International Search Report received in PCT/EP2019/073670, Dec. 4, 2019, 3 pages.
Written Opinion received in PCT/EP2019/073670, Dec. 4, 2019, 6 pages.
European Search Report received in EP Application No. 18192649.4, Mar. 6, 2019, 8 pages.
European Search Report received in EP Application No. 19180972.2, Dec. 13, 2019, 7 pages.
Office Action (w/o English translation) issued in Chinese Application No. 201980058085.X, Sep. 29, 2023, 8 pages.
Communication pursuant to Article 94(3) received in European Patent Application No. 19762167.5, dated Jun. 13, 2024, 11 pages.
Sun et al., "Learning Sparse Representation with Variational Auto-Encoder for Anomaly Detection," IEEE Access, vol. 6, pp. 33353-33361, Jul. 3, 2018, 9 pages.
Matsubara et al., "Anomaly Machine Component Detection by Deep Generative Model with Unregularized Score," arxiv.org, Cornell University Library, 201 OLIN Library Cornell University Ithaca, NY 14853, Jul. 16, 2018, 8 pages.
Office Action received in Chinese Application No. 201980058085, dated Jul. 11, 2024, with machine translation, 8 pages.

* cited by examiner

COMPUTER-IMPLEMENTED METHOD, COMPUTER PROGRAM PRODUCT AND SYSTEM FOR ANOMALY DETECTION AND/OR PREDICTIVE MAINTENANCE

CROSS REFERENCE TO RELATED APPLICATIONS

This is the U.S. National Stage of International Application No. PCT/EP2019/073670, filed Sep. 5, 2019, which was published in English under PCT Article 21(2), which in turn claims the benefit of European Patent Application No. 18192649.4, filed Sep. 5, 2018, and European Patent Application No. 19180972.2 filed on Jun. 18, 2019. The applications are incorporated herein by reference in their entirety.

The application relates to a computer-implemented method, a computer program product and a system for anomaly detection and/or predictive maintenance, in particular, using outlier detection in structured or unstructured data.

BACKGROUND

Anomaly detection in various systems, such as for predictive maintenance, cyber security, fraud prevention, etc. is becoming increasingly prevalent. In such systems, it is important to reliably and timely detect anomalies which may undermine the proper functioning of the system.

Predictive maintenance techniques for example aim to automatically determine when a piece of equipment (e.g. a machine or a machine component) requires maintenance to avoid breakage. By automatically estimating the degradation of the equipment significant cost savings can be achieved as compared to routine or time-based maintenance. In contrast, by scheduling at a fixed schedule there is risk that maintenance is performed earlier than necessary leading to excess expenses. There is also risk that the equipment fails earlier than expected potentially leading to catastrophic failure or process stops.

The predictive analysis methodologies can broadly be divided in two different methodologies. Firstly, so called unsupervised modelling/machine learning can be used to model the normal state of the investigated system without needing any external labels. Unsupervised modelling can answer the question: "Is the equipment behaving as normally or not?" but provides no further clues to investigate the system. Another, more widely applied, approach is using supervised modelling/machine learning. In the typical case, historical data has been collected and faults that have occurred historically have been investigated by domain experts and classified into failure types and possibly actions taken to correct the fault. A predictive model is then trained to predict when and what type of faults that will occur to provide more guidance on how to correct the system. In the latter case, an artificial neural network-based model may be used to predict when maintenance is required.

Artificial neural network models have been used in many applications in predictive maintenance. A non-exhaustive list includes:
  Using a neural network model to classify the state of a physical system based on measured physical parameters, i.e. classify the system according to predetermined operating conditions (such as good; bad; undetermined) (see references 1-4). Specific example systems include:
  Coal burning plants (see e.g. reference 5);
  Die casting (see e.g. reference 6);
  Battery manufacturing for electric cars (see e.g. reference 7);
  Oil and gas surface equipment (see e.g. reference 8);
  Electrical motors (see e.g. reference 9);
  Railway vehicle maintenance using recurrent neural networks (see e.g. reference 10);
  Control valves in an industrial plant (see e.g. reference 11);
  Using a neural network to predict the remaining life-time of equipment (see e.g. references 12,13). Specific example systems include:
  Milling machine cutter heads based on vibrations (see e.g. reference 14);
  Using neural network models as soft sensors of pollutants in a manufacturing plant to determine if pollutants are within determined limits (see e.g. reference 15);
  Using neural network model as an example method among others to classify system state (see e.g. references 16-20);
  Further examples include, but are not limited to:
  Prediction of remaining life of bearings based on vibration monitoring (see e.g. reference 21);
  Failure prediction of a hydroelectric unit using three statistical regression methods including neural networks (see e.g. reference 22);
  Prediction of remaining bearing life (see e.g. references 23-25);
  Classification of motor loads based on the motion current signature (see e.g. reference 26);
  Early fault detection of gearbox bearings in wind turbines (see e.g. references 27,28);
  Detect thermal defects in electrical equipment based using infrared thermography (see e.g. reference 29);
  Fault classification of worm gears driven by an electric motor based on vibration and sound signals (see e.g. reference 30);
  Prediction of wheel and rail wear based on profiles of load, speed and yaw angle (see e.g. reference 31);
  Predict absorber pipe temperatures for tube defect detection in concentrator solar power plant (see e.g. reference 32).

Other applications of neural networks for anomaly detection include for example detection of cyber security threats such as network intrusion or other types of malicious attacks. For example, network traffic may be modelled by using machine learning techniques. Thus, subtle changes in traffic patterns indicative of malicious actions and/or actors may be detected and classified as an intrusion. Another example is for detecting fraud, suspicious patterns or certain tendencies in financial transactions. For example, using historical data, machine learning based classifiers may be trained to classify a transaction or an actor (e.g. a fraudulent or trustworthy) or to identify a tendency.

Common to the above applications is using accumulated data (e.g. historical data) to characterize the system and using a machine learning model to distinguish between normal behavior and known types of anomalies. The machine learning model may be a deep learning model. Deep learning using deep neural networks has become very popular in many applications thanks to powerful transformations learned by deep neural networks. A deep neural network may be an artificial neural network having an input layer, an output layer and a plurality of hidden layers between the input and output layers. The long list of applications of deep learning models using deep neural networks indicates that such models can be used successfully for supervised predictive maintenance and anomaly detection in a wide range of applications. However, one problem of all data-driven modelling including deep learning and neural networks is that they cannot handle observations that differ from observations encountered during model training. In other words, they cannot handle outliers during prediction. Outliers (outlier observations) may be observations that are substantially different from the data used to train the model. Since outliers substantially differ from what the model has encountered before, the model behavior is undefined in such situations or the predictions cannot be trusted. Since model behavior when outliers are detected is undefined, errors of previous unknown types may go undetected.

However, when adopting deep learning in critical systems such as autonomous cars, diagnostic applications, power plant control systems, etc. it may be crucial to also flag unknown types of anomalies. Further, it may be important to understand when predictions provided by the deep learning system should not be trusted. In other words, it may be important to know not only whether or not a prediction provided by the deep learning system is accurate, but also whether the deep learning system should predict at all. Autonomous decisions can be improved by understanding the limits of the learned representations and by recognizing when new types of data or data not recognized by the deep learning system is encountered.

Many different methods have been proposed to allow deep neural networks to describe uncertainty in predictions. Many of these methods are based on training deep neural networks to perform Bayesian inference rather than point inferences during prediction. This means that rather than predicting a single point, the networks are trained to predict a distribution of possible points. The intuition is that observations the model cannot explain will have a broad distribution, or large uncertainty. One popular solution to perform Bayesian prediction is so called Monte-Carlo dropout (MC-dropout), disclosed in Y. Gal and Z. Gharamani, "Dropout as a Bayesian approximation: Representing model uncertainty in deep learning," in International Conference on Machine Learning, 2016, pp. 1050-1059. MC-dropout can be applied to neural networks that are trained using "dropout", a regularization technique for reducing overfitting in neural networks by dropping out (or in other words, ignoring) some units (e.g. neurons, nodes) in a neural network during the training phase. MC-dropout makes multiple inferences for each prediction, using so called Monte-Carlo sampling for prediction, while eliminating, or dropping out, network neurons randomly during prediction time. The different predictions vary due to dropout and describe a prediction distribution. The prediction uncertainty can then be quantified by calculating the entropy or variance of the resulting distribution.

Other methods for using dropout producing Monte-Carlo samples include: sampling based on batch-normalization parameters (M. Teye, H. Azizpour, and K. Smith, "Bayesian Uncertainty Estimation for Batch Normalized Deep Networks," ArXiv180206455 Stat, February 2018), prediction from different models in an ensemble (B. Lakshminarayanan, A. Pritzel, and C. Blundell, "Simple and scalable predictive uncertainty estimation using deep ensembles," in Advances in Neural Information Processing Systems, 2017, pp. 6405-6416), multiple "prediction heads" in a shared base network (I. Osband, C. Blundell, A. Pritzel, and B. Van Roy, "Deep exploration via bootstrapped DQN," in Advances in Neural Information Processing Systems, 2016, pp. 4026-4034; E. Ilg et al., "Uncertainty Estimates for Optical Flow with Multi-Hypotheses Networks," ArXiv180207095 Cs, February 2018), variational inference of weight distribution instead of regular point weights (C. Blundell, J. Cornebise, K. Kavukcuoglu, and D. Wierstra, "Weight uncertainty in neural networks," ArXiv Prepr. ArXiv150505424, 2015) and Laplace approximation of distribution from existing weights (H. Ritter, A. Botev, and D. Barber, "A Scalable Laplace Approximation for Neural Networks," February 2018).

However, these methods place assumptions on what type of model is used and may constrain how the network is constructed or trained, and/or rely on multiple inferences per prediction. This may limit their general applicability for real-time systems where making multiple inferences is impractical and/or for existing systems that do not fit into the constraints.

LIST OF REFERENCES

Reference 1: US 2019/0137985 A1;
Reference 2: EP 0633536 A1;
Reference 3: U.S. Pat. No. 5,566,092 A;
Reference 4: JP 5643387 B2;
Reference 5: CN 109255440 A;
Reference 6: KR 101677358 B1;
Reference 7: CN 106168799 B;
Reference 8: U.S. Pat. No. 8,676,721 B2;
Reference 9: CN 108921303 A;
Reference 10: EP 3179326 A1;
Reference 11: US 2016/0071004 A1;
Reference 12: DE 10161633 A1;
Reference 13: U.S. Pat. No. 7,457,785 B1;
Reference 14: U.S. Pat. No. 8,781,982 B1;
Reference 15: EP 0712509 B1;
Reference 16: EP 2871803 B1;
Reference 17: U.S. Pat. No. 8,275,642 B2;
Reference 18: FR 2698704 A1;
Reference 19: U.S. Pat. No. 6,298,308 B1;
Reference 20: JP 5043839 62;
Reference 21: Wu S, Gebraeel N, Lawley M A, Yih Y. A Neural Network Integrated Decision Support System for Condition-Based Optimal Predictive Maintenance Policy. IEEE Trans Syst Man Cybern—Part Syst Hum. 2007 March; 37(2):226-36;
Reference 22: Lucifredi A, Mazzieri C, Rossi M. APPLICATION OF MULTIREGRESSIVE LINEAR MODELS, DYNAMIC KRIGING MODELS AND NEURAL NE ORK MODELS TO PREDICTIVE MAINTENANCE OF HYDROELECTRIC POWER SYSTEMS. Mech Syst Signal Process. 2000 May 1;14(3):471-94;
Reference 23: Huang R, Xi L, Li X, Richard Liu C, Qiu H, Lee J. Residual life predictions for ball bearings based on self-organizing map and back propagation neural network methods. Mech Syst Signal Process. 2007 Jan. 1;21(1):193-207;
Reference 24: Shao Y, Nezu K. Prognosis of remaining bearing life using neural networks. Proc Inst Mech Eng Part J Syst Control Eng. 2000 May 1;214(3):217-30.
Reference 25: Vachtsevanos G, Wang P. Fault prognosis using dynamic wavelet neural networks. In: 2001 IEEE Autotestcon Proceedings IEEE Systems Readiness Technology Conference (Cat No01CH37237). 2001. p. 857-70;
Reference 26: Bansal D, Evans D J, Jones B. A real-time predictive maintenance system for machine systems. Int J Mach Tools Manuf. 2004 Jun. 1;44(7):759-66.
Reference 27: Bangalore P, Letzgus S, Karlsson D, Patriksson M. An artificial neural network-based condition monitoring method for wind turbines, with application to the monitoring of the gearbox. Wind Energy. 2017;20(8):1421-38;

Reference 28: Bangalore P, Tjernberg L B. An Artificial Neural Network Approach for Early Fault Detection of Gearbox Bearings. IEEE Trans Smart Grid. 2015 March;6(2):980-7;

Reference 29: Huda A S N, Taib S. Application of infrared thermography for predictive/preventive maintenance of thermal defect in electrical equipment. Appl Therm Eng. 2013 Nov. 3;61(2):220-7;

Reference 30: Waqar T, Demetgul M. Thermal analysis MLP neural network based fault diagnosis on worm gears. Measurement. 2016 May 1;86:56-66;

Reference 31: Shebani A, Iwnicki S. Prediction of wheel and rail wear under different contact conditions using artificial neural networks. Wear. 2018 Jul. 15;406-407:173-84;

Reference 32: Jimenez A A, Munoz C Q G, Marquez F P G, Zhang L. Artificial Intelligence for Concentrated Solar Plant Maintenance Management. In: Xu J, Hajiyev A, Nickel S, Gen M, editors. Proceedings of the Tenth International Conference on Management Science and Engineering Management. Springer Singapore; 2017. p. 125-34. (Advances in Intelligent Systems and Computing);

Reference 33: Saxena A, Goebel K, Simon D, Eklund N. Damage propagation modeling for aircraft engine run-to-failure simulation. In: 2008 International Conference on Prognostics and Health Management. 2008. p. 1-9;

Reference 34: Gers F A, Schmidhuber J, Cummins F. Learning to Forget: Continual Prediction with LSTM. Neural Comput. 1999;12:2451-2471;

Reference 35: Hochreiter S, Schmidhuber J. Long short-term memory. Neural Comput. 1997;9(8):1735-1780;

Reference 36: Kingma D P, Ba J. Adam: A Method for Stochastic Optimization. ArXiv14126980 Cs [Internet]. 2014 Dec. 22 [cited 2018 Jul. 3]; Available from: http://arxiv.org/abs/1412.6980.

SUMMARY

The present application addresses one or more of the above-mentioned problems. Thus, according to an aspect, the problem relates to an improved method and a system for anomaly detection and/or predictive maintenance that can deal not only with events of known types but also with events of previously unknown types. A further problem is to efficiently evaluate reliability of a prediction given by a deep neural network for an observation input to the deep neural network.

This problem is solved by the features disclosed by the independent claims. Further exemplary embodiments are defined by the dependent claims.

According to an aspect, a computer-implemented method for anomaly detection in an entity of interest (e.g. a monitored entity) is provided.

The method includes:
  receiving a new observation, said new observation characterizing at least one parameter of the entity;
  inputting the new observation to a deep neural network having a plurality of hidden layers and being trained using a training data set that includes possible observations that can be input to the deep neural network;
  obtaining a second set of intermediate output values that are output from at least one of the plurality of hidden layers of the deep neural network by inputting the received new observation to the deep neural network;
  mapping, using a latent variable model stored in a storage medium, the second set of intermediate output values to a second set of projected values;
  determining whether or not the received new observation is an outlier with respect to the training dataset based on the latent variable model and the second set of projected values,
  wherein the latent variable model stored in the storage medium is constructed by:
    obtaining first sets of intermediate output values that are output from said one of the plurality of hidden layers of the deep neural network, each of the first sets of intermediate output values obtained by inputting a different one of the possible observations included in at least a part of the training dataset; and
    constructing/fitting the latent variable model using the first sets of intermediate output values, the latent variable model providing a mapping of the first sets of intermediate output values to first sets of projected values in a sub-space of the latent variable model that has a dimension lower than a dimension of the sets of the intermediate outputs.

According to another aspect, a computer-implemented method for anomaly detection in an entity of interest is provided. The method includes:
  obtaining a deep neural network and at least a part of a training dataset used for training the deep neural network, the deep neural network comprising a plurality of hidden layers and being trained by using the training dataset, the training dataset including a plurality of possible observations that can be input to the deep neural network;
  obtaining first sets of intermediate output values that are output from at least one of the plurality of hidden layers, each of the first sets of intermediate output values obtained by inputting a different one of the possible observations included in said at least a part of the training dataset;
  constructing (i.e. fitting) a latent variable model using the first sets of intermediate output values, the latent variable model providing a mapping of the first sets of intermediate output values to first sets of projected values in a sub-space of the latent variable model that has a dimension lower than a dimension of the sets of the intermediate outputs;
  receiving a new observation to be input to the deep neural network;
  obtaining a second set of intermediate output values that are output from said at least one of the plurality of hidden layers of the deep neural network by inputting the received new observation to the deep neural network;
  mapping, using the latent variable model, the second set of intermediate output values to a second set of projected values;
  determining whether or not the received observation is an outlier with respect to the training dataset based on the latent variable model and the second set of projected values.

When the received observation is determined to be an outlier, it may be assumed that a prediction (e.g. an output) given by the deep neural network for the received observation is a new type of anomaly and/or that the prediction is less reliable than in case the received observation is determined to be a non-outlier. Accordingly, the method according to any of the above aspects may further comprise:

calculating, by the deep neural network, a prediction for the new observation; and determining a result indicative of the occurrence of at least one anomaly in the entity based on the prediction and the determination whether or not the new observation is an outlier.

According to yet another aspect, a computer-implemented method for predictive maintenance of an entity of interest is provided. The method comprises:

obtaining a new observation based on sensor data from at least one sensor measurement performed on the observed entity;

determining a result indicative of the occurrence of at least one anomaly in the entity according to the method of the various aspects, examples and embodiments described herein;

determining whether a corrective action should be taken and optionally, the type of the corrective action to be taken based on the result indicative of the occurrence of at least one anomaly.

The entity of interest may be any type of entity, for example a piece of equipment (such as a machine or a machine component) or a more complex technical system comprising a plurality of pieces of equipment. Non-limiting examples of an observed entity are a bioreactor, a fermenter, a power plant, an industrial plant, a vehicle, oil, gas, solar or wind energy equipment, motors, batteries, control valves, gears, etc. The observed entity may also be a computer or a computer system such as a computer network, for example a computer system/network enabling financial transactions.

The anomaly may be any deviation from the normal operation and/or state of the entity of interest. For example, the anomaly may relate to deviation in sensor data, network traffic volume and/or pattern, user behavior and/or biometric properties, etc.

The observation may be any data characterizing or indicative of at least one parameter of the observed entity. For example, the data may be data obtained by one or more sensors measuring the state of property of one or more pieces of equipment, data characterizing network traffic (e.g. logs of data packages transferred between different computers on a network), other transactional data, such as data related to financial transactions, etc. The measurements may be periodical or substantially continuous, for example real-time measurements. It is also possible that the measurements are initiated as a result of certain action (e.g. interaction of a user with a computer). The data may also be based on a combination or fusion of different input information, e.g. measurements from different sensors.

The prediction calculated by the deep neural network may include a prediction whether or not an anomaly is detected or likely to occur. Optionally, if it is determined that an anomaly is detected or is likely to occur, the prediction may include the type of anomaly detected or likely to occur.

The prediction may relate to or include one or more parameters indicative of the state or condition of the entity of interest. The one or more parameters may include physical parameters (such as temperature, velocity, etc.), remaining lifetime, wear, probability of failure or damage of the at least one piece of equipment, level of pollution or other undesired conditions, probability of fraud or attack, etc.

The prediction may also relate to or include a classification of the state or condition of the entity of interest according to predetermined operating conditions or criteria, such as good, bad, undetermined; secure, unsecure, vulnerable; trustworthy, fraudulent, etc.

Based on the prediction for the new observation and the result of the determination whether the new observation is an outlier, a result indicative of the occurrence of at least one anomaly in the entity is determined or generated. If, for example, it is determined that the new observation is not an outlier, the prediction may be accepted and outputted as a result indicative of the occurrence of at least one anomaly (shortly anomaly detection result). It is further possible to subject the accepted prediction to further processing, in order to determine the anomaly detection result. Based on the anomaly detection result, a further action (such as corrective action) may be initiated. The further action may depend on the specific application. For example, in case of predictive management, it may be determined whether and optionally which corrective maintenance action is required depending on the type of prediction/anomaly detection result. In case of cyber security or transaction security application, a computer, user, account, etc. may be blocked or other preventive actions may be undertaken, depending on the application and the type of prediction/anomaly detection result.

If, for example, the prediction/anomaly detection result indicates that there is no anomaly or if certain types of anomalies are detected, that are deemed not to be a threat to the normal operating, integrity or security of the observed device or system, the further action may be continuing the operating and/or monitoring of the system, granting access to an user, a computer, a server, etc., allowing a user, a computer, a server, etc. to initiate and/or complete a transaction, etc. If the prediction/anomaly detection result indicates that there is an anomaly, a corrective action may be undertaken such as corrective maintenance action, denial or a limitation of access to the entity, etc. The corrective action may depend on the type of anomaly detected as given by the prediction, wherein the nature of the corrective action may depend on the specific application. The corrective action may for example include scheduling a corrective maintenance action, changing at least one control parameter related to the entity of interest, shutting-down the entity of interest or at least one piece of equipment included in it, denying an access for or to the entity of interest (e.g. a particular computer, user, server, etc.). The at least one further action may also include displaying an information related to the state or condition of the observed system, issuing a warning, etc. The at least one further action may be determined and and/or started automatically or may require a manual intervention or further input from a user.

If the new observation is determined to be an outlier, the anomaly detection result may comprise an indication that the new observation relates to a new or unknown type of anomaly. The anomaly detection result may also comprise a warning to the user to analyze the outlier manually, before proceeding or discarding the outlier. If for instance the outlier observation is concluded to be triggered by faults in the monitoring system, for example a broken sensor monitoring equipment, the system operator may schedule that the monitoring system itself is corrected, by for example replacing the broken sensor. The outlier observation may also be due to a rare or new anomaly not observed in historical data, for instance equipment breakage in a new or rare way, a new way to perform computer network intrusion, or new type to perform a fraudulent transaction. In such case the outlier observation may be assigned a new type of anomaly class after further investigation, for example manual investigation, that can then be used to train an updated anomaly detection model including the new anomaly type in future monitoring.

In the various embodiments and examples described therein, the power of supervised predictive maintenance may be combined with unsupervised modelling by giving a predictive deep neural network the capability to detect outliers after model training. Using this approach, deep neural networks can be used to classify anomalies and fault types while also having a defined behavior even in the event of previously unknown anomalies or fault types.

In various embodiments and examples described herein, the data to be processed by the deep neural network may be structured or unstructured data. Unstructured data may be understood as data that either does not have a pre-defined data model or is not organized in a pre-defined manner. Unstructured data may have internal structure but is not structured via pre-defined data models or schema. Examples of unstructured data may include, but are not limited to, images, audio, videos, sensor data and texts. The data may be raw data (unprocessed data) or may be data that has been subjected to some preprocessing, such as normalization, noise removal, coding, contrast enhancement, edge enhancement, color or frequency conversion, resizing, cropping and/or other known data processing operations.

In some specific examples, the data to be processed by the deep neural network may be sensor data (e.g. temperature, pressure, current, flux, etc.) obtained from one or more sensors, such as, temperature sensor, acceleration sensor, pressure sensor, strain gauge, force sensor, microphone, image sensor, etc. Each of the possible observations included in the test dataset and the received observation may contain sensor data obtained by the one or more sensors at a point in time or during a period of time.

The sensors may also be so called soft sensors where the state of the equipment is calculated indirectly based on physical measurements. Exemplary soft sensors include Kalman filters, velocity estimators, estimators of product quality (e.g. food quality), etc. The sensors may also collect unstructured data in the form of audio or images. The data may also be data characterizing network traffic (e.g. logs of data packages transferred between different computers on a network) or other transactional data, such as data related to financial transactions.

In the present disclosure, an image may include a 2D array of pixels. Each of the pixels may include at least one value. For example, a pixel in a greyscale image may include one value indicating an intensity of the pixel. A pixel in a color image may include multiple values, for example three values, that indicate coordinates in a color space such as RGB color space. A pixel may also include a combination of different imaging modalities, for instance a combination of one or more intensity values from two different imaging apparatuses, such as phase contrast imaging and fluorescent imaging. In case images are processed by the deep neural network, each of the observations included in the test dataset and the received observation may contain an image.

In the present disclosure, the term "deep neural network" may be understood as an artificial neural network having an input layer, an output layer and a plurality of hidden layers provided between the input layer and the output layer. A hidden layer of a neural network may also be referred to as an "intermediate layer". Thus, an output from the hidden layer may be referred to as an "intermediate output". Further, an output from the hidden layer may include a plurality of values, each of which corresponds to a node included in the hidden layer. Accordingly, the term "set of intermediate output values" as used herein may indicate an output of a hidden layer, including a plurality of values that are output from respective nodes of the hidden layer.

The type of the deep neural network employed is not particularly limited. In some examples, the "deep neural network" in the present disclosure may be a feedforward neural network having a plurality of hidden layers. In a feedforward neural network, connections between nodes do not form a cycle. A specific example of a feedforward deep neural network may be a convolutional neural network (CNN) that is commonly applied to analyzing visual imagery.

In some other examples, the "deep neural network" in the present disclosure may be a recurrent neural network where connections between nodes form a directed graph along a sequence. A specific example of a recurrent deep neural network may be Long-Short Term Memory (LSTM) which can process sequential data.

Other exemplary deep neural networks are recursive neural networks and transformer neural networks.

In the present disclosure, the term "latent variable model" may be a statistical model that relates or maps a set of observable variables to a set of latent variables. In various embodiments and examples described herein, the (first or second) "set of intermediate output values" may be considered as the set of observable variables for the latent variable model. Further, in various embodiments and examples described herein, the "set of projected values" may be considered as the set of latent variables for the latent variable model.

In some examples, in the method according to the above-stated aspects, the latent variable model may be constructed or fitted according to principal component analysis.

In the present disclosure, the term "principal component analysis", also referred to as PCA, may be understood as indicating a statistical procedure that uses an orthogonal transformation to convert a set of observations of possibly correlated variables into a set of values of linearly uncorrelated variables called principal components.

Variants of PCA include but are not limited to: sparse PCA (Jenatton, R., Obozinski, G., & Bach, F. (2010, March). Structured sparse principal component analysis. In *Proceedings of the Thirteenth International Conference on Artificial Intelligence and Statistics* (pp. 366-373)). Alternatives to PCA include but are not limited to: random projections (Dasgupta, S. (2000, June). Experiments with random projection. In *Proceedings of the Sixteenth Conference on Uncertainty in Artificial Intelligence* (pp. 143-151). Morgan Kaufmann Publishers Inc.); sparse random projections (Achlioptas, D. (2003). Database-friendly random projections: Johnson-Lindenstrauss with binary coins. *Journal of Computer and System Sciences,* 66(4), 671-687.); very sparse random projections (Li, P., Hastie, T. J., & Church, K. W. (2006, August). Very sparse random projections. In *Proceedings of the 12th ACM SIGKDD International Conference on Knowledge Discovery and Data Mining* (pp. 287-296). ACM); and self-organizing maps (Kohonen, T. (1998). The self-organizing map. *Neurocomputing,* 21(1-3), 1-6.)

In some other examples, in the method according to the above-stated aspects, the latent variable model may be constructed or fitted using an autoencoder. An "autoencoder" may be a type of artificial neural network used to learn efficient data codings in an unsupervised manner. One form of an autoencoder may be a feedforward, non-recurrent neural network having an input layer, an output layer and one or more hidden layers connecting them, with the output layer having the same number of nodes as the input layer, and with the purpose of reconstructing its own inputs. Different types of autoencoders include but are not limited to variational autoencoders (Kingma, D. P., & Welling, M. (2013). Auto-encoding variational bayes. *arXiv preprint arXiv:*1312.6114.); and sparse autoencoders (Makhzani, A., & Frey, B. (2013). K-sparse autoencoders. *arXiv preprint arXiv:*1312.5663.).

Using the latent variable model, a distance of the new observation to the latent variable model, or in other words from the latent variable approximation, may be determined. Based on the determined distance, a determination as to whether or not the new observation is an outlier may be made. The determining as to whether or not the received new observation is an outlier may for example comprise determining whether the distance of the new observation to the latent variable model is greater than a threshold distance. If the calculated distance of the new observation is greater than the threshold distance it may be determined that the new observation is an outlier.

The threshold distance may be determined by calculating, using the latent variable model, a distance of each of the observations of the at least a part of the training dataset to the latent variable model and determining the threshold distance based on the determined distances. Accordingly, the method according to any of the above aspects may further comprise determining a threshold distance based on a plurality of distances, each of which being calculated for a different one of the first sets of projected values with respect to the distribution of the first sets of projected values.

Further, in the method according to the above-stated aspects, said step of determining whether or not the received observation is an outlier may comprise:
    calculating a distance of the second set of projected values with respect to a distribution of the first sets of projected values; and
    determining that the received observation is an outlier with respect to the training dataset if the calculated distance is larger than a threshold value for the distance.

The threshold value for the distance may be determined based on distances, each of which may be calculated for a different one of the first sets of projected values with respect to the distribution of the first sets of projected values.

The distance metric may be any distance metric suitable to quantify the distance from the latent variable approximation (i.e. the first set of projected values). For example, the distance may be a residual sum of squares (RSS), Mahalanobis distance, Local Outlier Factor or LOF (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104). The distance may also be a compound distance based on compound distance metric that is formed by combining two or more of the described distances.

The determined distance may be in particular a Mahalanobis distance. In the present disclosure, the term "Mahalanobis distance" may be understood as indicating a known measure of the distance between a point P (e.g., corresponding to an observation) and a distribution D. More specifically, the "Mahalanobis distance" measures how many standard deviations away an observation is from the origin in a multivariate probability distribution.

The determined distance may be a residual sum of squares (RSS). For example, in the method according to the above-stated aspects, said step of determining whether or not the received observation is an outlier may comprise:
    determining an approximate set of intermediate output values corresponding to the second set of intermediate output values, using the latent variable model and the second set of projected values;
    calculating a squared approximation residual for the second set of intermediate output values and the approximate set of intermediate output values; and
    determining that the received new observation is an outlier with respect to the training dataset if the calculated squared approximation residual is larger than a threshold value for the squared approximation residual.

The threshold value for the squared approximation residual may be determined based on squared approximation residuals, each of which may be calculated for a different one of the first sets of intermediate output values and an approximate set of intermediate output values corresponding to said one of the first sets of intermediate output values.

In the present disclosure, the term "squared approximation residual" may be understood as indicating a sum of squares of residuals, where a residual is a difference between an observed value and an approximated value provided by the latent variable model.

Further, in the method according to the above-stated aspects, the steps of obtaining the first sets of intermediate output values and constructing the latent variable model may be performed for two or more of the plurality of hidden layers;
    wherein the steps of obtaining the second set of intermediate output values and mapping the second set of intermediate output values to the second set of projected values may be performed concerning said two or more of the plurality of hidden layers; and
    wherein, the step of determining whether or not the received observation is an outlier may be performed based on the latent variable model and the second sets of projected values obtained concerning said two or more of the plurality of hidden layers.

Still further, in the method according to the above-stated aspects, the step of obtaining the intermediate output values that are output from at least one of the plurality of hidden layers of the deep neural network may comprise determining activations from the at least one of the plurality of hidden layers and optionally applying a global pooling on the determined activations. The activations may be for example in form of activation vectors.

An activation vector $a_i$ (or activation) of a particular observation x from a layer i (i=1, 2, 3, . . . ) of a given deep neural network may correspond to the intermediate output from the layer i and may include components with values corresponding to outputs from respective nodes of the layer i when the observation is input to the given network. Each of the activations or activation vectors on the various layers of the deep neural network may provide a feature representation of the input data (i.e. the input observation). In other words, the activations may provide transformed, or pre-processed, representations of the input data at the various layers of the deep neural network.

In particular, the step of obtaining the first intermediate output values that are output from at least one of the plurality of hidden layers of the deep neural network based on the observations of the training dataset may comprise determining activations of said observations from the at least one of the plurality of hidden layers and optionally applying a global pooling on the determined activations. Similarly, the step of obtaining the second intermediate output values that are output from at least one of the plurality of hidden layers of the deep neural network based on the new observation may comprise determining activations of the new observation from the at least one of the plurality of hidden layers and optionally applying a global pooling on the determined activations. The global pooling may be global average pooling.

For example, if the activations are from feature maps, global pooling (e.g. global average pooling) may be applied across each feature map. The latent variable model may be subsequently constructed or fitted on the (optionally pooled) activations, i.e. on the (optionally pooled) training set activations and on the (optionally pooled) activations calculated for the new observation input to the deep neural network.

Global Average Pooling (GAP) refers to the procedure of transforming the feature map representation of the network activations to a vector representation (see e.g. Lin, Min, Qiang Chen, and Shuicheng Yan. "Network in network." arXiv preprint arXiv:1312.4400 (2013)). This step discards spatial information resulting in a vector where each element corresponds to the average activation of a particular feature map. For example, for a particular hidden layer in a convolutional neural network, the activation of an image x are described by features maps A that may have dimensions w x h x c, where h is the pixel height of the feature map, w is the pixel width of the feature map and c is the number of feature map in the current hidden layer. The global average pooling of feature map $k \in [1, c]$ of A is then given by $$GAP_k(A) = \sum_{i=0}^{w} \sum_{j=0}^{h} A_{j,i,k}$$

or $$GAP_k(A) \approx \sum_{i=0}^{w} \sum_{j=0}^{h} A_{j,i,k},$$

for example:

$$GAP_k(A) = \frac{1}{w \cdot h} \sum_{i=0}^{w} \sum_{j=0}^{h} A_{j,i,k}$$

The vector of global average pooled feature maps A for image x is then given by:

$$GAP(A) = [GAP_1(A), GAP_2(A), \ldots, GAP_c(A)]$$

The above equation may be also applied to other types of observations.

Further, the method according to any one of the above aspects may comprise training of the deep neural network or fine tuning a trained deep neural network using the training dataset.

How well the method according to the above-stated aspect can distinguish outliers and non-outliers may be evaluated using, for example, the Receiver-Operating Characteristic Area-Under-Curve (ROC-AUC) metric. For instance, when the Mahalanobis distance and/or the squared approximation residual and/or other distance metrics is/are calculated for determining whether or not the received observation is an outlier, the ROC curves may be calculated by comparing how well the Mahalanobis distances and/or the squared approximation residuals and/or the other distance metrics separate outliers from non-outliers. Other metrics which may be used to evaluate the method include but are not limited to: (1) precision, which is a fraction of observations identified as outliers by the system that actually are outliers; (2) recall, which is a fraction of all outliers that are successfully identified as outliers by the system; (3) F1-score, which is a harmonic mean of precision and recall; and (4) accuracy, which is a fraction of correct identifications by the system out of all identifications.

According to yet another aspect, a computer program product is provided. The computer program product comprises computer-readable instructions that, when loaded and run on a computer, cause the computer to perform the method according to any one of the above-stated aspects.

According to yet another aspect, a system for data analysis for anomaly detection and/or predictive maintenance is provided. The system comprises:
  a data acquisition unit for obtaining at least one observation characterizing a parameter of an entity of interest (observed entity);
  a storage medium storing a training dataset used for training a deep neural network, the deep neural network comprising a plurality of hidden layers, the training dataset including possible observations that can be input to the deep neural network; and
  a predictive analytics unit (predictive analytics component) comprising at least one processor configured to perform the method according to any one of the above-stated aspects and examples.

For example, the processor may be configured to
  obtain the deep neural network trained using the training dataset;
  obtain at least a part of the training dataset stored in the storage medium;
  obtain first sets of intermediate output values that are output from at least one of the plurality of hidden layers, each of the first sets of intermediate output values obtained by inputting a different one of the possible observations included in at least a part of the training dataset;
  construct/fit a latent variable model using the first sets of intermediate output values, the latent variable model providing a mapping of the first sets of intermediate output values to first sets of projected values in a sub-space that has a dimension lower than a dimension of the sets of the intermediate outputs;
  receive a new observation to be input to the deep neural network;
  obtain a second set of intermediate output values that are output from said at least one of the plurality of hidden layers by inputting the received new observation to the deep neural network;
  map, using the latent variable model, the second set of intermediate output values to a second set of projected values; and
  determine whether or not the received new observation is an outlier with respect to the training dataset based on the latent variable model and the second set of projected values.

The at least one processor may be further configured to:
  calculate, by the deep neural network, a prediction for the new observation; and
  determine a result indicative of the occurrence of at least one anomaly in the entity based on the prediction and the determination whether or not the new observation is an outlier.

In the system according to the above-stated aspect, the latent variable model may be constructed according to principal component analysis or using an autoencoder.

In the system according to the above-stated aspect, for determining whether or not the received observation is an outlier, the processor may be further configured to:

calculate a distance of the second set of projected values with respect to a distribution of the first sets of projected values; and determine that the received new observation is an outlier with respect to the training dataset if the calculated distance is larger than a threshold value for the distance.

As mentioned above, the distance may be a Mahalanobis distance, residual sum of squares, Local Outlier Factor, compound distance or any other suitable distance measure.

For example, in the system according to the above-stated aspect, for determining whether or not the received new observation is an outlier, the at least one processor may be further configured to:

determine an approximate set of intermediate output values corresponding to the second set of intermediate output values, using the latent variable model and the second set of projected values;

calculate a squared approximation residual for the second set of intermediate output values and the approximate set of intermediate output values; and determine that the received new observation is an outlier with respect to the training dataset if the calculated squared approximation residual is larger than a threshold value for the squared approximation residual.

In the system according to the above-stated aspect, the at least one processor may be further configured to:

perform the steps of obtaining the first sets of intermediate output values and constructing the latent variable model for two or more of the plurality of hidden layers;

perform the steps of obtaining the second set of intermediate output values and mapping the second set of intermediate output values to the second set of projected values concerning said two or more of the plurality of hidden layers; and perform the step of determining whether or not the received new observation is an outlier based on the latent variable model and the second sets of projected values obtained concerning said two or more of the plurality of hidden layers.

Further, in the system according to the above-stated aspect, the at least one processor may be further configured to determine activations from the at least one of the plurality of hidden layers and optionally applying a global pooling on the determined activations. The (optionally pooled) activations may thus constitute the first/second intermediate output values.

The at least one processor may be a part of a general-purpose computer, a dedicated computing unit, a server or a computer network.

The system according to the above-stated aspect may further comprise a storage medium for storing parameters of the deep neural network (for example, weights, node connections, filters, etc.). The specific parameters stored generally depends on the type of the deep neural network employed. Further, the system may comprise a storage medium for storing the latent variable model, data obtained by using the latent variable model such as distances, threshold distance(s), and/or other data.

One or more of the above described storage mediums may be a part of a data store where collected data is accumulated, processed and/or analyzed. The data store may be implemented in a server (e.g. an on-premise or local server) or as a distributed network service, such as a cloud service.

Further, the system may comprise one or more sensors to measure the state or at least one parameter characterizing the state of the entity of interest or a component of the entity of interest. The measured parameters may be any physical, electronic or other parameters such as temperature, pressure, current, flux, network traffic, data logs, etc. The at least one sensor may be a soft sensor. The at least one sensor may be configured to carry out periodical or substantially continuous measurement. In an example, the at least one sensor may be configured to perform real-time measurements. It is also possible to configure the sensor to start measurement upon a trigger. For example, a measurement may be started a result of certain action such as an interaction of a user with a computer. In an example, multiple sensors may be provided and the observations inputted to the deep neural network may be based on a combination or fusion of different input information, e.g. measurements from different sensors.

Further, the system may comprise a data communication unit or lines allowing data transfer between the one or more sensor, the data acquisition unit, the storage medium for storing the transferred data and/or the predictive analytics unit. In an example, the data transfer between the one or more sensor and the data acquisition unit may be wireless.

The system may further include a user interface (for example a graphical and/or audio and/or haptic user interface) that is configured to convey information regarding the prediction and/or the state or condition of the at least one piece of equipment and/or the overall system based on the prediction. The user interface may be further configured to convey (e.g. display) information regarding the measured parameters of the at least one piece of equipment. The user interface may be further configured to enable the user to change of at least one parameter of the at least one piece of equipment of the observed system.

The predictive analytics unit may be further configured to aggregate and model the collected data, for example to predict when maintenance is required. The analytics component may for instance be run directly on the entity of interest (for example a piece of equipment, a machine, a computer, etc.), constituting so called edge analytics.

According to various aspects and examples stated above, it is possible to detect outliers after model training to a deep neural network. The outliers in input data with respect to the training dataset can be efficiently detected, as less assumptions of how the deep neural network is constructed may be necessary and sampling may not be required. Further, according to various aspects and examples stated above, an already learned data representation may be used for outlier detection. In contrast to separate outlier detection models, the same representation used for prediction can be used for detection of outliers.

Further advantages of the methods and the systems according to various aspects and examples stated above, may include:

They are architecture-agnostic, meaning that they can be used in any type of neural network model;

They are training-agnostic. The calculation involves a single pass through the training data after the neural network is trained, meaning that the interference with regular training procedures is minimal;

They are task-agnostic, meaning that no assumptions about the task at hand need to be made. The proposed approach can be applied various tasks, such as classification, segmentation, regression, reinforcement learning and so on; They are efficient in terms of computation, meaning that compared to the inference of the deep neural network model very little additional computation is needed.

They outperform state-of-the-art methods in outlier detection.

The proposed techniques are "general purpose" techniques, in the sense of being applicable to any type of input, for example sensor input, network traffic, financial transaction traffic, etc. The areas of application of the method and the system according to various aspects and examples stated above include, but are not limited to, monitoring and/or predictive maintenance of machine components, machine or systems comprising a plurality of machine components and/or machines.

Specific, non-limiting examples relate to anomaly (e.g. fault) detection and/or predictive maintenance of bearings, gears, wheels, control valves, batteries, motors (e.g. electrical motors), turbines, vehicles (e.g. railway vehicles, electric cars), bioreactors, fermenters, computers, computer-networks, rails, oil and gas surface equipment, control and/or monitoring of industrial or power plants (such as solar power plant, coal burning plants), control and/or monitoring of industrial processes (e.g. die casting, battery manufacturing, biotechnological processes, drug manufacturing, etc.).

Another possible application is for detection of cyber security threats, e.g. network intrusion or other types of malicious attacks. For example, network traffic may be modelled by using machine learning techniques. Thus, subtle changes in traffic patterns indicative of malicious actions and/or actors may be detected and classified as an intrusion. Yet another possible application is for detecting fraud, suspicious patterns or certain tendencies in financial transactions. For example, using historical data, machine learning based classifiers may be trained to classify a transaction or an actor (e.g. a fraudulent or trustworthy) or to identify a tendency.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general-purpose computer system. In other examples, the system may be a special purpose computer system including an embedded system.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

System Configuration

Figure 1:
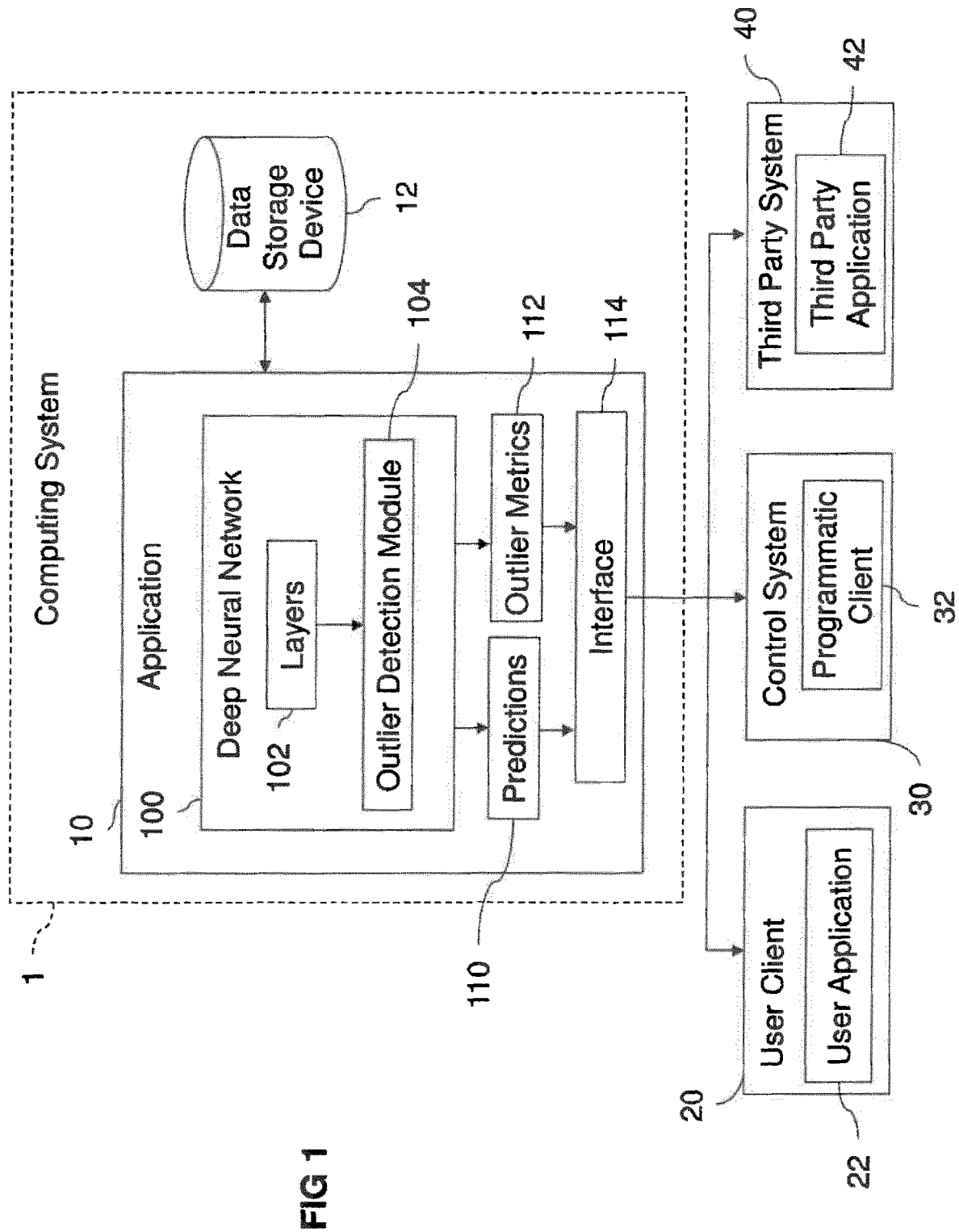
FIG. 1 shows an example of a system including the system according to the present disclosure.

FIG. 1 shows an example of a system including the system according to the present disclosure.

The system shown in FIG. 1 may comprise a computing system 1, a user client 20, a control system 30 and a third party system 40.

The computing system 1 may provide the system for data analysis, according to the present disclosure. The computing system 1 may be implemented using one or more general purpose computers, for example. As shown in FIG. 1, the computing system 1 may comprise an application 10 and a data storage device 12.

The application 10 may be implemented by a software application including instructions that cause a computer to perform exemplary processes of the computing system as will be described later in more detail. As shown in FIG. 1, the application 10 may comprise a deep neural network 100, predictions 110, outlier metrics 112 and an interface 114. The application may be provided or run by a predictive analytics component or unit.

The deep neural network (hereinafter, also referred to as "DNN") 100 may be an artificial neural network having an input layer, an output layer and a plurality of hidden layers in between the input and output layers. The deep neural network 100 may be trained for processing any type of data, such as for example sensor data, computer network traffic data, transactional data, etc. In an example, the deep neural network 100 may be trained for processing images obtained by respective sensors, using a training dataset including possible input images to the deep neural network 100. The training dataset may be stored in the data storage device 12 accessible by the application 10. In the example of FIG. 1, the deep neural network 100 may include layers 102 and an outlier detection module 104.

The layers 102 may include an input layer (not shown), an output layer (not shown) and a plurality of hidden layers (not shown) provided between the input layer and the output layer.

The outlier detection module 104 may be connected to at least one of the plurality of hidden layers of the deep neural network 100 and be configured to determine whether or not an observation is an outlier with respect to the training dataset used for training the deep neural network 100. The details of the process performed by the outlier detection module 104 will be described later.

Figure 2:
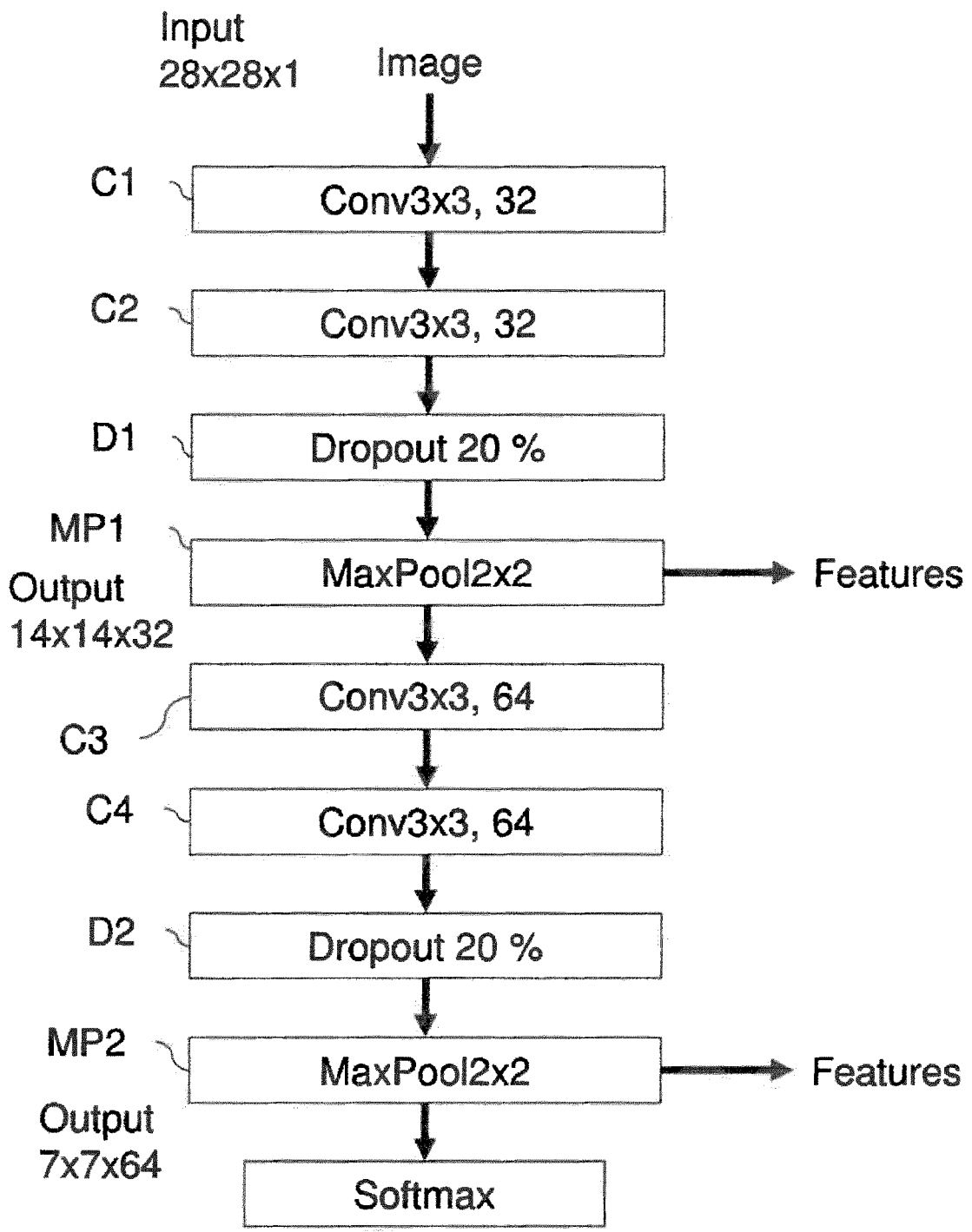
FIG. 2 shows an exemplary configuration of a convolutional neural network (CNN) for processing images.

FIG. 2 shows a specific example of the deep neural network 100. The exemplary deep neural network shown in FIG. 2 is a convolutional neural network (CNN) for classifying data, for example images. For example, the exemplary CNN shown in FIG. 2 may classify input observations such as input images into a number of different categories. In another example, the exemplary CNN shown in FIG. 2 may determine whether or not an input observation (e.g. an image) belongs to a particular category. In a specific example, the exemplary CNN shown in FIG. 2 may be configured to receive a greyscale image of 28×28 pixels as an input image (i.e. input observation). Each pixel of the input image may include a value indicating an intensity of the pixel. The intensity value of each pixel of the input image may be considered as an input value to an input node of an input layer of the exemplary CNN. The exemplary CNN shown in FIG. 2 comprises four convolutional layers C1, C2, C3, C4, two max pool layers MP1, MP2 and an output layer with a softmax function as the activation function of nodes included in the output layer.

While the above example uses a 28×28 pixel image, from a theoretical perspective, there is no upper limit on the size of the image. However, increasing the image size may also increase computational demands. In general, the image size selected for the application of interest may reflect a trade-off between a desired level of detail and computational demands. In typical classification applications, images may range from 200×200 pixels to 300×300 pixels. However, applications are not limited to this range, and may be smaller than 200×200 pixels or greater than 300×300 pixels.

Each node included in the convolutional layer C1 of the exemplary CNN may correspond to a filter of size 3×3 (pixels), applied to a particular part of the input image and may output a value resulting from applying the filter to the particular part of the input image. In the example of FIG. 2, 32 filters are applied to the input image at the convolutional layer C1. Each of the 32 filters may be applied to the whole area of the input image by sliding the filter with a stride of S pixel(s) in both width and height directions of the input image. For each location of the 32 filters on the input image, 32 nodes corresponding to the 32 filters may be present in the convolutional layer C1. In the example of FIG. 2, the stride S may be set to 1 pixel. The output of the convolutional layer C1 may thus include 28×28×32 values, which may be considered as 32 images of 28×28 pixels. The output of the convolutional layer C1 may be input to the convolutional layer C2. The convolutional layer C2 may have a configuration analogous to the convolutional layer C1 with 32 filters of size 3×3. Accordingly, the output of the convolutional layer C2 may also include 28×28×32 values, which may be considered as 32 images of 28×28 pixels.

The output of the convolutional layer C2 may be subject to 20% of dropout (see D1 of FIG. 2). In other words, 20% of the values (corresponding to nodes) in the output of the convolutional layer C2 may be randomly selected and disregarded.

After the dropout operation D1, the output of the convolutional layer C2 may be further subject to down-sampling by a max-pooling operation at the first max pool layer MP1. The max pooling operation may select the maximum value among a plurality of input values. In the example of FIG. 2, the max pool layer MP1 may apply filters having a size of 2×2 may be applied, with a stride of 2 pixels, to each of the 32 images with 28×28 pixels output from the convolutional layer C2. This may result in 32 output images including 14×14 pixels each of which has the maximum intensity value among the pixels of the corresponding image (output from the convolutional layer C2) within the corresponding filter. Each filter used in the max pooling operation may be considered as a node of the max pool layer MP1.

The output from the max pool layer MP1 may be provided to the convolutional layer C3, having a configuration analogous to that of the convolutional layers C1, C2, but applying 64 filters. The output of the convolutional layer C3 may be provided to the convolutional layer C4, having an analogous configuration as the convolutional layer C3, with 64 filters of size 3×3. Further, the output of the convolutional layer C4 may be subject to 20% of dropout (see D2 of FIG. 2) and then subject to the max-pooling operation at the max pool layer MP2 in a manner analogous to that at the max pool layer MP1 as stated above. The output of the max pool layer MP2 may include 7×7×64 values.

Finally, the output of the max pool layer MP2 may be provided to the output layer with a softmax function. The output layer may include one or more output nodes corresponding to one or more groups (or categories) into which the input image may be classified. While this example refers to specific parameters (e.g., a number of filters, a dropout percentage, number of convolutional layers, stride, etc.), the methods and systems are not limited to these embodiments, as a range of values for each parameter is contemplated herein.

In some examples, concerning the exemplary CNN shown in FIG. 2, the outputs from the max pool layers MP1 and MP2 may be provided to the outlier detection module 104 (FIG. 1) for detecting whether or not the input image is an outlier with respect to the training dataset used for training the exemplary CNN shown in FIG. 2. For instance, the outlier detection module 104 may construct or fit, for each of the max pool layers MP1 and MP2, a latent variable model using the outputs from the respective max pool layers MP1 and MP2 for possible input images in the training dataset. The latent variable model may provide a mapping of the outputs of the max pool layer MP1 or MP2 to sets of projected values in a sub-space (latent variable model subspace) that has a dimension lower than a dimension of the outputs of the max pool layer MP1 or MP2. The constructed or fitted latent variable model may be used for determining whether or not an input image (e.g., a newly obtained input image that is not included in the training dataset) is an outlier with respect to the training dataset. In more general terms, the outlier detection module 104 may be configured to obtain outputs from one (or more) of the hidden layers of the deep neural network 100 and construct or fit the latent variable model using the obtained outputs. The details of the constructing or fitting a latent variable model will be described later below.

Referring again to FIG. 1, the predictions 110 may be outputs from the deep neural network 100. In some examples, the predictions 110 may indicate which category the input image is classified into by the deep neural network 100.

The outlier metrics 112 may include metrics for determining whether an input image is an outlier with respect to the training dataset used for training the deep neural network 100. The details of the outlier metrics 112 will be described later below.

The interface 114 may be an interface for the application 10 to communicate with various devices that may be provided outside the computing system 1. For example, the interface 114 may be configured to communicate information generated by the application 10 to those devices. Further, for example, the interface 114 may be configured to receive information directed to the application 10 from those devices.

The data storage device 12 may be configured to store data that is used by the application 100. Although FIG. 1 shows the data storage device 12 to be a part of the computing system 1, in some examples, the data storage device 12 may be provided outside the computing system, as long as the data stored in the data storage device 12 is accessible by the application 10.

The user client 20 may be a client device connected to the computing system 1. The user client 20 may include a user application 22 that may use the predictions and the results of outlier detection performed at the computing system 1, A specific example of the user client 20 may be a workstation remotely connected to a computational server, for instance using SSH (Secure Shell) or HTTP (Hypertext Transfer Protocol) requests. The DNN (deep neural network) can then be applied to user-provided input on the computational server and the resulting predictions and outlier metrics can be returned to the user client 20. The user client 20 may be part of the same physical device as the computing system 1 running the application 10, for instance on a workstation configured to perform DNN predictions.

The control and/or analysis system 30 may control a device and/or perform further data analysis using the predictions and the results of outlier detection performed at the computing system 1. The control and/or analysis system 30 may constitute or be a part of a system for anomaly detection and/or for predictive maintenance. An example of the control and/or analysis system 30 may be a control and/or analysis system (such as for anomaly detection or predictive maintenance) of a machine component or machine, an industrial process or plant, a vehicle (such as an autonomous vehicle), a computer network, a financial transaction unit, etc.

For example, in a vehicle, the control and/or analysis system may receive the prediction and the results of outlier detection to control the steering of the vehicle and/or provide an indication related to the state, wear, and/or life-time one or more pieces of equipment included in the vehicle (such as motor, gears, etc.) and/or the necessary corrective maintenance action.

The control and/or analysis system 30 may comprise a programmatic client 32 running in the control and/or analysis system 30 receiving an input, performing data analysis and making decisions regarding further application specific actions, for example related to the maintenance of the observed entity (e.g. a piece of equipment or a system) and or related to the control of the observed entity (e.g. a piece of equipment or a system).

A specific example of the present techniques relates to characterization of input material to the analysis and/or control system of a biopharmaceutical manufacturing process. To ensure desired output quality of such manufacturing processes, control parameters of the process may be adjusted according to properties of the input material. Further, corrective maintenance operations may be determined and/or initiated, such as for example cleaning or replacement of sensors, temperature, humidity, etc. regulators, nutrition solutions, cell cultures, etc.

A heterogeneous combination of data sources may be used to characterize the input material including both structured and unstructured data. Example data sources may include text, such as event reports, images, chromatograms, spectroscopic data, chemical analysis, etc. Deep learning is well suited to analyze such heterogeneous combination of data due to deep learning's ability to find useful mappings from both structured and unstructured data to a given output. To avoid poor output quality or catastrophic failure when input data does not match the data used to train the deep learning model, it may be important to detect outliers after model training. If input data are identified as an outlier, the input data may not be used as input to the manufacturing process since the output quality cannot be guaranteed.

Another specific example of the present techniques is in control and monitoring systems (such as predictive maintenance systems) learned from data using deep reinforcement learning, rather than programmed by a human controller. In a biopharmaceutical manufacturing process, there may be a large number of possible control parameters and it may be challenging to find all interactions and feedback loops existing in the system due to high complexity. Instead deep reinforcement learning may be used to learn control policies from data and simulation. To detect when the process enters a state that is different from states encountered during model training, outlier detection may be important. If such state is identified as an outlier, the deep learning based control system may warn the user (e.g., by sending a notification to the user) and/or may perform safety routines to avoid poor output quality or catastrophic failure. Examples of the use of deep reinforcement learning may be found in the art (e.g., Li, Y., Wen, Y., Guan, K., & Tao, D. (2017). Transforming Cooling Optimization for Green Data Center via Deep Reinforcement Learning. *arXiv preprint arXiv*:1709.05077; and Nguyen, P. & Takashi, E. (2018). Automating Water Purification Plant Operations Using Deep Deterministic Policy Gradient. In *Proceedings of Workshop* (Published at ICML Workshop for Deep Learning for Safety-Critical in Engineering Systems)).

Unlike prior art methods for outlier detection in deep learning models, the present methods do not constrain how the model is designed and/or trained, allowing these methods to be added to models in production. Additionally, as the present techniques are used after model training, the present techniques may be used with real-time applications and/or models implemented in a live application. Applications for anomaly detection may have very high velocity, meaning that predictive model will receive observations with high frequency. For example, monitoring of revolving turbines may be measured at 10 kHz. Similarly, a system monitoring a computer network or a banking system may receive observations at high frequency since there typically are very many concurrent actors in such systems. In contrast, prior art methods that use multiple forward-passes/inferences per prediction (e.g., wherein the prediction is used as the average and the standard deviation or entropy is used as the uncertainty measure), may lead to increases in latency, which is problematic for real-time applications. Further, the proposed techniques are architecture agnostic, training agnostic and task agnostic.

The third party system 40 may be implemented by a computer and may include a third party application 42. The third party system 40 may belong to an entity that is different from an entity to which the computing system 1 belongs to. The third party application 42 may use the predictions and the results of outlier detection performed at the computing system 1. A specific example of the third party application 42 may be a software relying on DNN predictions and results of outlier detection purchased from a DNN prediction provider.

The computing system 1 may be connected with the user client 20, the control system 30 and the third party system 40 via a network such as the Internet. In some examples, one or more of the user client 20, the control system 30 and the third party system 40 may be connected to the computing system 1 via an intranet.

Prediction-Time Outlier Detection using Partial Least Squares Regression

As mentioned above, the outlier detection module 104 in the computing system 1 shown in FIG. 1 may be configured to construct or fit a latent variable model using intermediate output values that are output from at least one of the plurality of hidden layers of the deep neural network 100 (e.g., the max pool layer MP1 or MP2 of FIG. 2), in order to determine whether or not an input observation (e.g. an input image) is an outlier with respect to the training dataset used for training the deep neural network 100. The intermediate output values may for example be activations of the respective input images from the at least one of plurality of hidden layers of the deep neural network 100. Optionally, if activations are from feature maps, a global pooling (e.g. a global average pooling) may be applied across each feature map.

The following provides an exemplary technique for outlier detection using partial least squares regression, which may facilitate understanding of how the outlier detection module 104 can detect outliers.

The concept of model uncertainty is related to that of prediction time outlier detection. In both cases, the main objective may be to find observations that do not correspond to observations with which the model has been trained. Predictive models have long been used to detect out-of-distribution observations during prediction in manufacturing process monitoring. In this field, linear latent variable models such as partial least squares (PLS) regression are widely used (see e.g., P. Geladi and B. R. Kowalski, "Partial least-squares regression: a tutorial," Anal. Chim. Acta, vol. 185, no. Supplement C, pp. 1-17, January 1986). A PLS model can find a sub-space approximating the training data similar to Principal Component Analysis (PCA) (S. Wold, K. Esbensen, and P. Geladi, "Principal component analysis," Chemom. Intell. Lab. Syst., vol. 2, no. 1, pp. 37-52, August 1987), which is used for predictions. New observations may then be projected onto the sub-space found by the PLS model. Accordingly, both distance within the sub-space and distance from the sub-space can be used to find outliers during prediction-time.

Prediction time refers to the time after the model has been fitted and the model is used for prediction in an application (and does not include time for model fitting/training, when the model is generated).

It is noted that, although simple and effective, the principles for the PLS model as mentioned above may not be directly applied to a deep learning system. Specifically, the basis for prediction of PLS is a sub-space of the input data space, making it straight-forward to compare the sub-space approximation of new observations to those used for training. Deep learning models, on the other hand, typically depend on multiple layers of non-linear transformations, where each transformation contributes to the final output. This may mean that seemingly different observations are transformed through a sequence of spaces and mapped to an output. This ability to find useful transformation of input to output may be the reason why deep learning models work well for unstructured data. However, a consequence of these transformations may be that the transformations make it difficult to determine whether or not new observations belong to the same data distribution that the model was trained on. There may be no obvious point of comparison to determine the limits of the deep learning model's knowledge and no obvious way to decide if a new observation is within those limits.

PLS regression is a widely used regression model within, for example, manufacturing process monitoring. Given a training data matrix with n rows of observations and p columns of features, denoted $X=[x_1 \ldots x_n]^T$, with corresponding target matrix with q columns of responses, denoted Y, a PLS model may summarize both data-matrices. Similar to PCA, PLS may find full-rank sub-spaces, of equal dimension k, called "latent variable spaces" that approximate X and Y. In contrast to PCA, the PLS may maximize the covariance between the sub-spaces found, instead of maximizing the variance of a single sub-space. In short, PLS may approximates the input data as:

$$X=TP^T+E \quad (1)$$

Where $T=[t_1, \ldots t_k]$ may be an n×k latent variable matrix spanning a full-rank sub-space of the column-space of X and maximizing the covariance with Y, P may be p×k matrix of PLS loadings, and E may be an n×p matrix of approximation residuals. The loadings may contain the linear combination weights used to approximate X from T. The response matrix for Y may be approximated in a similar way. More details on how to calculate the PLS model and use it for regression can be found in S. Wold, M. SjÖström, and L. Eriksson, "PLS-regression: a basic tool of chemometrics," Chemom. Intell. Lab. Syst., vol. 58, no. 2, pp. 109-130, October 2001.

The approximation of the input data provided by PLS can be used to detect outliers encountered during prediction. After model fitting, new observations may be projected onto the sub-space found using PLS by:

$$T_{new}=X_{new}P \quad (2),$$

which may allow approximation of the new observations as:

$$X_{new}\approx \hat{X}=T_{new}P^T \quad (3).$$

Both the sub-space projection, $T_{new}$, and the approximation may be used to detect outliers based on a suitable distance metric. Two exemplary measures used to detect outliers during prediction-time are Mahalanobis distance in the latent variable space and approximation residuals in the input column space. Other measures may be compound distance, Local Outlier Factor (LOF), etc.

One way to detect outliers during prediction-time when using PLS may be to use Mahalanobis distance. The Mahalanobis distance is a known statistical distance measuring how many standard deviations away an observation is from the origin in a multivariate probability distribution. The intuition may be that observations with large Mahalanobis distances are unlikely under the given probability distribution. A latent variable probability distribution may be parametrized using a covariance matrix, $C_T$, of the latent variables in T, assuming that the latent variables have zero mean. Then the Mahalanobis distance $d_i$ of an observation $x_i$ with projection $t_i$ in latent variable space may be calculated as:

$$d_i=\sqrt{t_i^T C_T^{-1} t_i} \quad (4)$$

While the Mahalanobis distance can measure how unlikely an observation is under the given distribution, the Mahalanobis distance may provide no information whether or not the observation belongs to that distribution. In contrast, the approximation residuals can provide a simple measure of how far from the distribution a new observation is. Given a fitted PLS model, an observation $x_i$ may be approximated as $\hat{x}_i$. The squared approximation residual may then be simply given by:

$$RSS = \Sigma_{j=1}^{P}(x_{i,j} - \hat{x}_{i,j})^2 \qquad (5)$$

where $x_{i,j}$ may be the j-th element of the observation vector. The intuition may be that the approximation of observations from another distribution than the training distribution will fail resulting in large approximation residuals.

Prediction-Time Outlier Detection for Deep Neural Networks

The outlier detection module 104 may perform an add-on method based on the principles for prediction time outliers in, e.g. manufacturing process monitoring, as stated above, for finding observations that the deep neural network 100 may not be able to explain. The deep neural network 100 may be any type of neural network, for example convolutional neural network (CNN), recurrent neural network, recursive neural network, transformer neural network, etc.

The method performed by the outlier detection module 104 to detect prediction-time outliers in a deep learning system may be based on the fact that a neural network may function by transforming input data. When input data is fed through a deep neural network, multiple intermediate representations of the data may exist, where the intermediate representations may be used for prediction (e.g., of a group into which the input data is classified in case of the deep neural network is configured to solve a classification problem). One or more of these intermediate representations may be used for detecting outliers during prediction, as well as for performing the prediction.

In order to provide a possibility to detect outliers during prediction in a similar way as PLS, a deep neural network (e.g. a feed-forward neural network) may be considered as a series of non-linear transformations. In other words, an activation vector $a_i$ of an observation x (input data) from layer i (=1, 2, 3, 4, ...,) of the given network may be given by the nested series of transformations as follows:

$$a_i = f_i(W_i f_{i-1}(W_{i-1} f_{i-2}(\ldots f_1(W_1 x)))) \qquad (6)$$

where $f_k$ (k=1, 2, ..., i) may be activation functions and $W_k$ (k=1, 2, ..., i) may be weight matrices. The activation vector $a_i$ of the observation x may be considered as an intermediate output from the layer i of the given network and may include element values corresponding to outputs from respective nodes of the layer i when the observation x is input to the given network. Each of these activations $a_k$ may provide a feature representation of the input data. Although the weight matrices may be commonly obtained by supervised training by means of back-propagation, the activations may simply provide transformed, or pre-processed, representations of the input data.

To explain the transformation in more detail, observation x may be an n-dimensional row vector $x=[x_1 x_2 \ldots x_n]$ wherein n depends on the application. In the case of x which is a single channel image, n may be the image's length in pixels multiplied with the image's width in pixels and the values $x_1, x_2, \ldots, x_n$ are the pixel values of the image. In the first layer, x is matrix multiplied with the first weight matrix $W_1$ to form the linear projection $\hat{x}$ which is $n_1$-dimensional. The dimension of $W_1$ is $n \times n_1$. After linear projection, an activation function $f_1$ is applied to $\hat{x}$ to form activation $a_1$. The activation function $f_1$ may be a non-linear function. Common choices of activation functions include the rectified linear function $f(x)=\max(0, x)$, the sigmoid function $f(x)=(1+e^{-x})^{-1}$, the softmax function $f(x)_j = e^{x_j}/\Sigma_{m=1}^{n} e^{x_m}$, among others. Then, the activation $a_1$ is matrix multiplied with the weight matrix $W_2$ and the resulting linear projection $\hat{a}_1$ is transformed using an activation function. The procedure of matrix multiplication with weight matrices and transformation using activation functions is repeated i times until activation $a_i$ of layer i is obtained.

Using these intermediate representations, a plug-and-play method for detecting outliers in any deep neural network, e.g. any feed-forward neural network, may be provided. Given a trained network, the training data can be represented using the activation matrix $A_i = [a_{1,i} \ldots a_{n,i}]^T$ from layer i, where n may be the number of observations. Since $A_i$ may not be full-rank, it may be desirable to find a full-rank sub-space that can be used to approximate $A_i$. In some examples, PCA may be used to obtain the sub-space using linear projections, for mapping the data to a low-dimensional sub-space. In some other examples, other methods such as autoencoders, random projections, sparse principal components analysis, and/or self-organizing maps may be used for mapping the data to a low-dimensional sub-space.

In the examples of using PCA, the dimensionality of the training data activations can be reduced to m dimensions to obtain:

$$T_A, P_A = PCA(A_i) \qquad (7)$$

Similar to PLS, $T_A$ may denote the latent-variable matrix spanning a sub-space of the training set activations and $P_A$ may denote the PCA loadings. For example, PCA in matrix form may provide the following least squares model:

$$A_i = T_A P_A^T + E \qquad (8)$$

which may be considered analogous to equation (1) as stated above.

In the same manner as PLS, the covariance matrix of the latent variables and loading matrices may be used to detect prediction-time outliers based on a suitable distance metric, such as based on Mahalanobis distance, approximation residual, compound metric distance, Local Outliner Factor (LOF), etc.

When new observations are predicted using the trained neural network, the activations $A_{i,new}$ may also be extracted. The new activations may be projected to the sub-space found from the training data activations in the same way as when using PLS:

$$T_{A,new} = A_{i,new} P_A \qquad (9)$$

And the distances, for example Mahalobis distances, of the new observations may be calculated according to the equation (4).

The new activations may also be approximated using the PCA loadings as:

$$A_{i,new} \approx \hat{A}_{i,new} = T_{A,new} P_A^T \qquad (10)$$

The approximation residual calculated according to the following equation (11) (analogous to equation (5)) may also be used to detect outliers in the same way as when using PLS:

$$RSS = \Sigma_{j=1}^{P}(a_{i,j} - \hat{a}_{i,j})^2 \qquad (11)$$

where p may indicate the number of nodes in layer i.

The determined distance may also be a compound distance metric, that is formed by combining two or more of the described distances. One example is to combine the Mahalanobis distance and residual distance, given by the square root of the residual sum of squares, using the Euclidean norm as:

$$d_{combined} = \sqrt{d_{\text{Mahalanobis}}^2 + d_{\text{residual}}^2} \quad (12)$$

The above is only one example of a compound distance metric, many other combinations are also possible.

The above equations, namely equations (7) to (12), have been adapted in a novel manner as provided herein to apply activations from deep neural networks.

Process for System Setup

Figure 3:
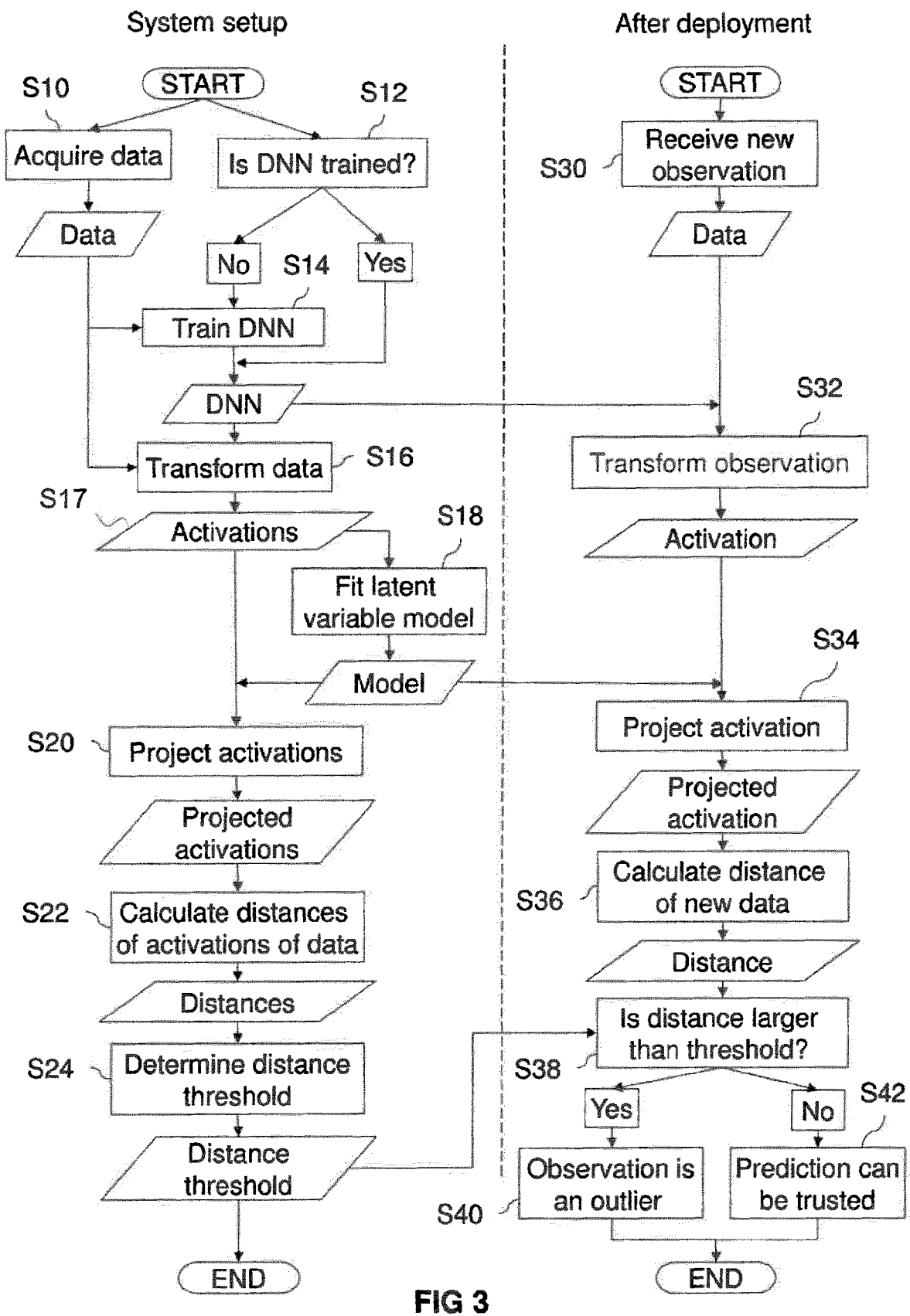
FIG. 3 shows a flowchart of exemplary processes performed by the system according to the present disclosure.

The left hand part of FIG. 3 shows a flowchart of an exemplary process for setting up the computing system 1. The exemplary process shown in FIG. 3 may be performed by the application 10 of the computing system 1.

At step S10, the application 10 may acquire data from the data storage device 12. The data may be at least a part of a training dataset for training the deep neural network 100. The training dataset may include possible observations input to the deep neural network 100. The observations constituting the training set may be sensor data, computer network traffic data, financial transactions data or any other historical data that characterized the observed piece of equipment or system. In case the deep neural network 100 is a CNN as shown in FIG. 2, for example, the training dataset may include possible input images to the CNN as the possible observations.

At step S12, the application 10 may determine whether or not the deep neural network 100 has already been trained. Step S12 may be performed before, after, or in parallel with step S10.

If it is determined that the deep neural network 100 has not yet been trained (No at step S12), the process may proceed to step S14. If it is determined that the deep neural network 100 has already been trained (Yes at step S12), the process may proceed to step S16. Alternatively, before proceeding to step S16, the deep neural network 100 may be fine-tuned.

At step S14, the application 10 may train the deep neural network 100 using the data acquired at step S10.

At step S16, the application 10 may transform data using the deep neural network 100. At step S17 the application 10 may obtain intermediate output values that are output from at least one of the plurality of hidden layers of the deep neural network 100 (first sets of intermediate output values). Specifically, for example, the application 10 may obtain the activation vectors from at least one layer of the deep neural network 100 according to equation (6) stated above, of the possible input images in the training dataset. An activation refers to the result of a sequence of matrix multiplications and transformation using an activation function by an observation as described by equation (6). Optionally, if the activations are from feature maps, global pooling across each feature map may be applied, for instance average pooling.

At step S18, the application 10 may fit a latent variable model on the intermediate output values, for example on (optionally pooled) training set activations. In other words, the application 10 may construct the latent variable model. For example, the application 10 may obtain the latent-variable matrix $T_A$ and the PCA loadings $P_A$ using PCA as stated above (see e.g., equations (7) and (8)). Alternatively, the application may train an autoencoder using the (optionally pooled) activation vectors as inputs.

At step S20, the application 10 may project activations using the latent variable model. For example, the application 10 may obtain, from the activation vectors obtained at step S17, corresponding sets of projected values (e.g., T) in the sub-space found by constructing/fitting the latent variable model.

At step S22, the application 10 may use the latent variable model to calculate one or more set of distances of the training set images. For example, the application may calculate distances of activations of data. Any suitable distance metric may be used. For example, the application 10 may calculate the Mahalonobis distance for each of the activation vectors obtained at step S17, with respect to the latent variable model constructed at step S18, according to equation (4) stated above. Additionally or alternatively, for example, the application 10 may calculate the squared approximation residual for each of the activation vectors obtained at step S17 according to equation (11) stated above.

At step S24, the application 10 may determine a threshold value for the distance. Additionally or alternatively, a threshold value for the squared approximation residual may be determined. The threshold value(s) may later be used for determining whether a new observation (e.g. input image) is an outlier with respect to the training dataset.

For obtaining the threshold value(s), the distances and/or the squared approximation residuals calculated at step S22 may be used. For instance, the threshold value may be a percentile, e.g. the $95^{th}$ percentile, of the distances (or the squared approximation residuals) calculated at step S22. It is noted that the "$95^{th}$ percentile" is merely an example and a value greater or lower than 95 may also be used as the percentile to determine the threshold.

The process for system setup may end after step S24.

Process for Outlier Detection

The right hand side of FIG. 3 shows an exemplary process performed by the computing system 1 for detecting outliers.

The process may begin by deploying the deep neural network. For example, the deep neural network may be incorporated in the software used to process the observations. This may be within the observed piece of equipment or system itself, or as a standalone software module for analysis realized for example as a server or as a cloud service.

At step S30, the application 10 may receive a new observation. For example, in case the deep neural network 100 is a CNN as shown in FIG. 2, an image to be input to the CNN may be received as the new observation. However, the observation is not limited to an image but may be any piece of data that characterizes the observed piece of equipment or system. For example, the observation may be a particular measurement data obtained by one or more sensors.

At step S32, the application 10 may transform the new observation using the deep neural network. The transforming may include for example calculating the deep neural network predictions for the new observation.

Subsequently, the application may determine whether the new observation is an outlier. This may be performed in the following manner:

At step S33 the application 10 may obtain intermediate output values that are output from at least one of the plurality of hidden layers of the deep neural network 100 (second set of intermediate output values). For example, the application 10 may obtain the activation vector from at least one layer of the deep neural network 100 according to equation (6) stated above, of the new observation.

At step S34, the application 10 may project the determined intermediate values (second set of intermediate values), using the latent variable model constructed/fitted at step S18 as stated above. For example, the application 10 may obtain, from the activation vector obtained at step S32, a corresponding set of projected values (e.g., $T_{A,new}$) in the sub-space found by constructing/fitting the latent variable model (see equation (9)).

At step S36, the application 10 may calculate a distance of the new observation using the latent variable model of step S18 as stated above. For example, the application 10 may calculate the Mahalanobis distance for the activation vector of the new observation obtained at step S32, with respect to the latent variable model constructed at step S18, according to equation (4) stated above. Additionally or alternatively, for example, the application 10 may calculate the squared approximation residual for the activation vector of the new observation obtained at step S32 according to equation (11) stated above. As mentioned above, other suitable distance metrics may be used instead of Mahalanobis distance and squared approximation residual.

At step S38, the application 10 may determine whether or not the distance calculated at step S36 is larger than the threshold determined at step S24.

If yes at step S38, the process may proceed to step S40 and the application 10 may determine that the new observation is an outlier. In this case, the system may report the model prediction as an unreliable prediction, since the new observation is determined to be an outlier. The anomaly detection result may thus include data that the prediction relates to a new type of anomaly and/or is an unreliable prediction. The process may end after step S40. Alternatively, other application specific actions may be taken. For example, the deep neural network's prediction may be ignored and the outlier observation discarded. It is also possible to generate a warning that a new type of anomaly is detected and optionally save the outlier observation and/or the predication, so that they can be subjected to further analysis.

If no at step S38, the process may proceed to step S42 and the application 10 may determine that the prediction made by the deep neural network 100 for the new observation can be trusted. In this case, the system may report the model prediction as a reliable prediction, since the new observation is determined to be a non-outlier. The prediction may then be output as a anomaly detection result. The process may end after step S42. Alternatively, further application specific actions may be undertaken.

In case of predictive maintenance, the application specific action may relate to determining the type of the corrective maintenance action that needs to be undertaken, advantageously before the substantive errors actually occur. The information regarding the determined corrective maintenance action may be conveyed to the user using a suitable user interface (e.g. a display). It is also possible to automatically schedule and/or start the determined corrective maintenance action.

In case of cyber security application, the further application specific action may be determining the type of security breach or that a particular user, computer, server, network, etc. is considered untrustworthy, etc. The respective information may be conveyed to the user using a suitable user interface (e.g. a display). Further, a corrective action, such as for example denying access to a particular user, computer, server, etc., may be automatically scheduled and/or started.

In banking, the further application specific action may relate to determining that an electronic transaction or electronic transactions with a particular participant is fraudulent and may further include conveying the determined information to the user using a suitable user interface (e.g. a display). Further, a corrective action, such as for example denying access to a particular user, computer, server, etc., may be automatically scheduled and/or started.

In the embodiments and examples of the present application, the deep learning model employing a deep neural network is trained using historical data characterizing the observed system, whatever it may be. The deep learning model is subsequently used to process input data (new observations) to distinguish between normal behavior and known types of anomalies. In contrast to known approaches, the deep learning model employing deep neural network is also capable of identifying unknown types of anomalies as well.

Experiments

In this section, results of experiments for outlier detection performed by the exemplary computing system 1 will be described. In the following experiments, the deep neural network 100 are directed to solve image classification tasks, for example for anomaly detection, in particular for predictive maintenance.

Example 1: Predictive Maintenance of Turbofan Engines

In some implementations, a CNN can be used as the deep neural network 100 for image analysis. The exemplary computing system 1, however, can also perform outlier detection in analyzing types of data other than images. For example, outlier detection by the exemplary computing system 1 may be performed for a predictive maintenance task in which conditions of in-service equipment are determined in order to predict when maintenance should be performed. This section provides experimental results of outlier detection for predictive maintenance of turbofan engines.

In this experiment, the Turbofan Engine Degradation dataset provided by the Prognostics CoE at NASA Ames (Saxena, A. and Goebel, K. "Turbofan Engine Degradation Simulation Data Set", NASA Ames Prognostics Data Repository (http://ti.arc.nasa.gov/project/prognostic-data-repository), 2008, NASA Ames Research Center, Moffett Field, CA) was used. The dataset consists of simulated turbofan engines running to failure under different operational conditions and fault modes. The engines were monitored over time using 21 sensors. The sensors used included temperature sensors, pressure sensors, fan and core speed sensors, coolant bleed measurements and burner fuel-air ratio measurements. The details of the dataset can be found in, for example, Saxena, A., Goebel, K., Simon, D., & Eklund, N., "Damage propagation modeling for aircraft engine run-to-failure simulation", In *Prognostics and Health Management*, 2008, PHM 2008, *International Conference on* (pp. 1-9), IEEE, October 2008. Further, 3 control settings were recorded for 100 engines in the training dataset and 100 in the test dataset. The challenge is to predict failure 15 sensor cycles before the failure happens to avoid catastrophic failure.

To predict failure, a neural network model based on Long-Short Term Memory (LSTM)-block (Hochreiter, Sepp, and Jürgen Schmidhuber. "Long Short-Term Memory." Neural Computation 9, no. 8,1997, p. 1735-1780; Gers, Felix A., Jürgen Schmidhuber, and Fred Cummins. "Learning to Forget: Continual Prediction with LSTM." Neural Computation 12,1999, p. 2451-2471) was trained. An LSTM block may be understood as a unit in a recurrent neural network and may comprise a cell, an input gate, an output gate and a forget gate. The cell may "remember" values over arbitrary time intervals, e.g. implementing an internal "memory". Each of the input, output and forget gates may be considered as a node in a neural network, which computes an activation of a weighted sum using an activation function. The input, output and forget gates may be connected to the cell and may be considered as regulators of the flow of values that goes through the connections of the LSTM block. The LSTM model was used as the deep neural network 100 of the computing system 1 in this experiment.

Figure 4:
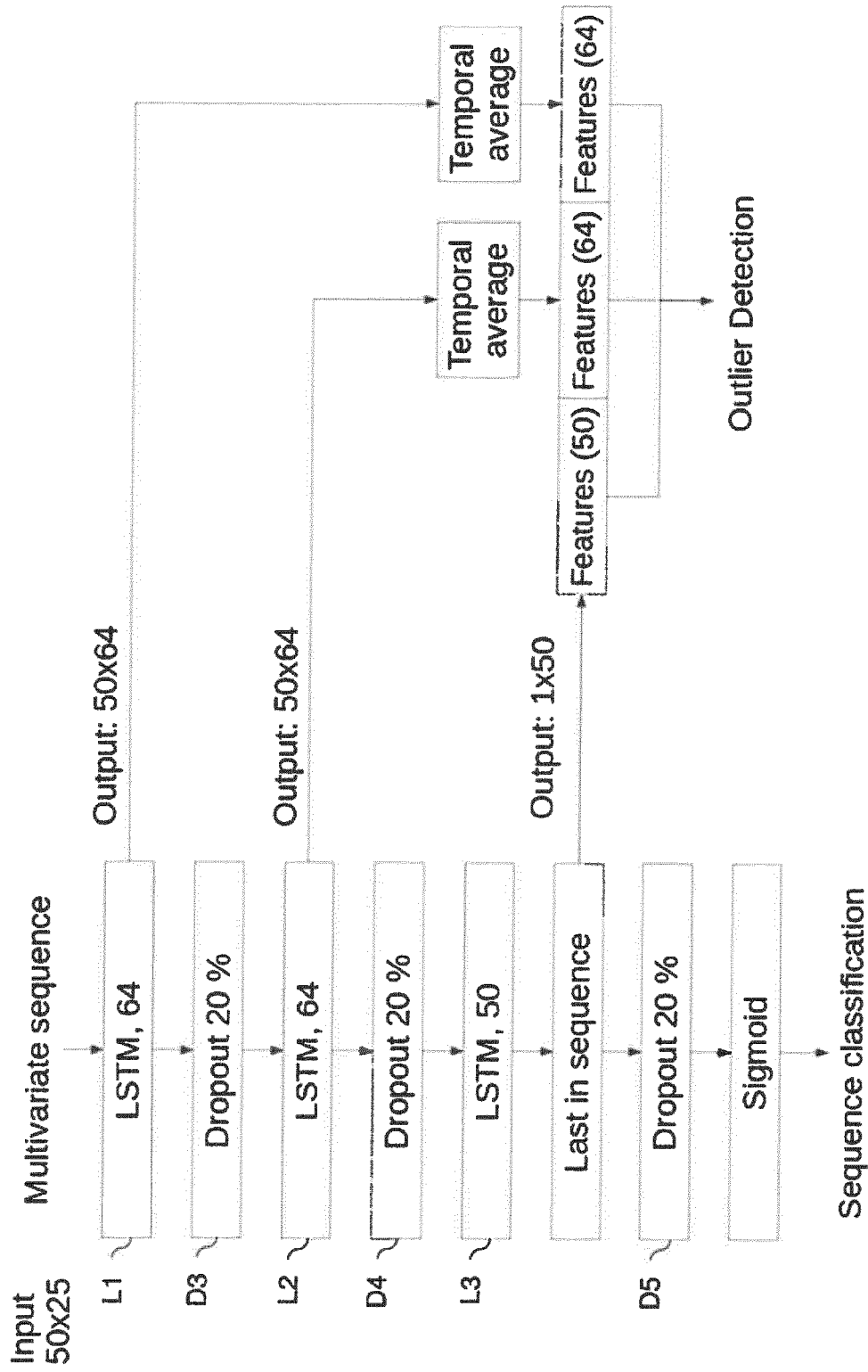
FIG. 4 shows an exemplary network architecture used for a predictive maintenance model and exemplary features extracted for outlier detection.

FIG. 4 shows an exemplary configuration of the LSTM-model (an example of the deep neural network 100) trained for predicting failure using the Turbofan Engine Degradation dataset in this experiment. The LSTM-model shown in FIG. 4 comprises three LSTM-layers L1, L2, L3 and an output layer with a sigmoid function as the activation function. The LSTM-layers L1 and L2 respectively comprise 64 LSTM blocks and the LSTM layer L3 comprises 50 LSTM blocks. The LSTM-layers L1, L2, L3 may be considered as the hidden layers of the deep neural network 100. To train the LSTM-model shown in FIG. 4, sliding windows that were 50 cycles long was used as input and a binary response indicating whether or not the last cycle of the sliding window is within 15 cycles away from a failure. The 21 sensor outputs, the 3 control settings and the current cycle from the beginning were used as variables for failure prediction. All variables were scaled to range 0-1, and the scaling parameters for the training data were used for scaling the test data.

To monitor training progression, 10% of the training dataset was used for validation. The LSTM model was trained until binary cross entropy for the validation set stopped increasing (eight epochs) using the Adam optimizer (Kingma, Diederik P., and Jimmy Ba. "Adam: A Method for Stochastic Optimization." ArXiv:1412.6980 [Cs], Dec. 22, 2014, Available: http://arxiv.org/abs/1412.6980 [Accessed: 25 Jul. 2018]). The resulting model achieved a test-set F1-score of 94.1% at sliding window classification. The test-set performance of the predictive maintenance model is summarized in the following Table 2.

TABLE 2

Summary of test-set performance of the predictive maintenance model

| Metric | Test set score |
| --- | --- |
| Accuracy | 0.968 |
| Precision | 0.923 |
| Recall | 0.96 |
| F1-score | 0.941 |

To simulate prediction time outliers where a sensor stops working, half of the test set engines were randomly chosen to serve as outliers. For each of these engines, a sensor was randomly chosen and its output was set to zero starting at the middle of the full time sequence. To provide a latent variable model for detecting these outliers, features (e.g., intermediate outputs) were extracted from the LSTM-layers L1, L2, L3 of the predictive maintenance model (see FIG. 4). For the first two LSTM-layers L1, L2, the average across time for each LSTM-node was used to summarize each sliding window. For the last LSTM-layer L3, simply the last cycle in the time sequence was used. The output from the three LSTM-layers L1, L2, L3 were then concatenated into a single matrix.

An outlier detection module was set up based on PCA, where a 100-component PCA-model was fit on all the training data LSTM-features. The approximation residual sum-of-squares was calculated for all training set sliding windows, and the 99.9th percentile of training residual sum-of-squares was set as cutoff for outliers. Then the outlier and remaining test-set LSTM-features were projected on the PCA-model and the approximation residual sum-of-squares was calculated for all sliding windows, as can be seen from FIG. 5. Thus, the methods and systems as described herein may be used in addition to the predictive maintenance model to handle detection and management of outliers. While the predictive maintenance model is accurate at the task it has been trained for, this model cannot handle unexpected events such as sensor breakage (which is not engine breakage).

Figure 5:
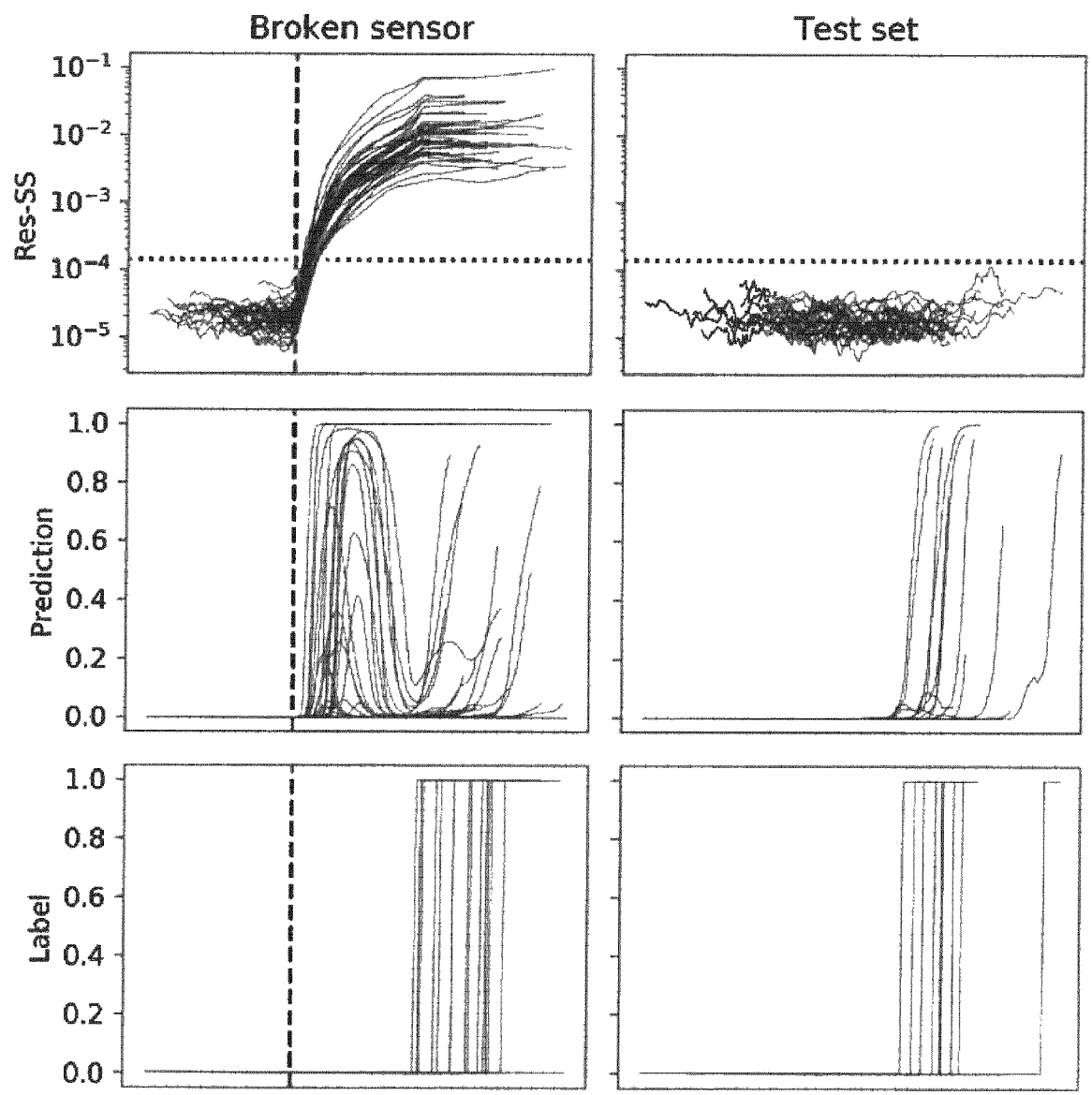
FIG. 5 shows outlier detection on test set sequences for predictive maintenance.

FIG. 5 shows results of outlier detection on test set sequences for predictive maintenance. The left side of FIG. 5 shows sequences where one random sensor breaks aligned at sensor breakage (vertical dashed line indicating when sensor broke) and the right side of FIG. 5 shows test set without sensor breakage aligned at middle time point. Top row figures in FIG. 5 show residual sum-of-squares for outlier detection, horizontal dashed line indicating the 99.9th percentile based on training set distances. Middle row figures in FIG. 5 show the model's prediction if the turbine is going to break within 15 cycles, where 1 means that the engine is predicted to fail. Bottom row figures in FIG. 5 show the labels indicating if the turbine is going to break within 15 cycles, where 1 means that the engine is going to fail. Outliers were successfully distinguished from normal variation (precision=recall=1 for this experiment). Following sensor breakage, the LSTM-model predict that many of the engines are going to break but the residual sum-of-squares increase simultaneously. For the test set, the model predicts engine failure correctly while the residual sum-of-squares does not increase. This shows that by using the present method it is possible to distinguish between predictions that should not be trusted and those that should be. It also shows that the present method is applicable not only to feed-forward networks, but also to recurrent networks.

Figure 6:
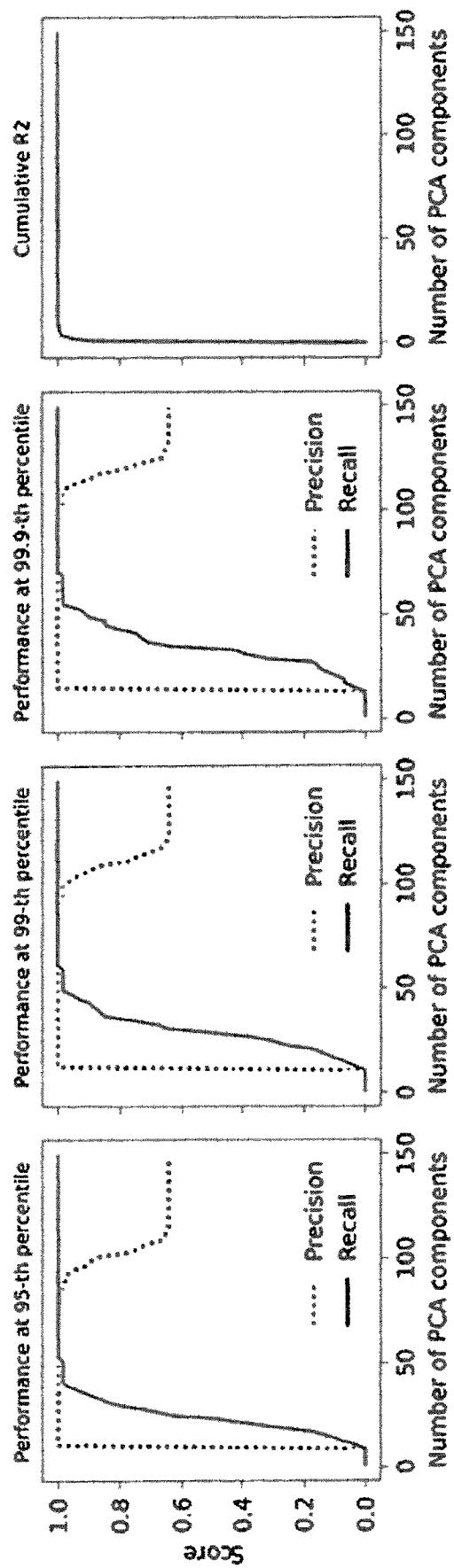
FIG. 6 shows evaluation of outlier detection performance for predictive maintenance depending on number of PCA components and cutoff-percentile.

Further, how the number of components and residual sum-of-squares influence the results was explored. The number of components was varied from 1 to 150 and the precision and recall for outlier detection were reported using the 95th, 99th and 99.9th percentiles of training set residual sum-of-squares as cutoff, as can be seen from FIG. 6. FIG. 6 shows evaluation of outlier detection performance for predictive maintenance depending on number of PCA components and cutoff-percentile. Interestingly, precision and recall of 1 was achieved for all cutoffs but the number of components required to do so increase with stricter cutoffs. For all cutoffs, components with very small explained variation is required to achieve high precision and recall (99.99% cumulative R2 is reached after only 36 components). This shows that the variation that differ between outliers and normal test set sequences are small nuances that require very small PCA components to be captured. At all cutoffs, over-fitting was observed with reduced precision when the number of components becomes too large. At stricter cutoffs, however, a larger number of components is tolerated before over-fitting occurs. In this experiment, a PCA model explaining 99.999% of the training LSTM-feature variation provides a good basis for outlier detection with precision and recall of 1 at both 99th and 99.9th percentile cutoff.

Example 2: Anomaly Detection in the Field of Cyber-security

Another specifically effective use-case of the invention in the field of predictive maintenance is its use in the field of cyber-security. One way of using deep learning in cyber-security is to detect obfuscated PowerShell-scripts (Hendler D, Kels S, Rubin A. Detecting Malicious PowerShell Commands Using Deep Neural Networks. In: Proceedings of the 2018 on Asia Conference on Computer and Communications Security [Internet]. New York, NY, USA: ACM; 2018 [cited 2019 Aug. 29]. p. 187-197. (ASIACCS '18); available from: http://doi.acm.org/10.1145/3196494.3196511).

Microsoft's PowerShell is a command-line tool and programming language installed on Windows computers by default, and commonly used by system administrators for a wide array of operations tasks. Symantec has recently reported that cyber-criminals increasingly use PowerShell as a target for attacks (PowerShell Threats Grow Further and Operate in Plain Sight [Internet]. [cited 2019 Aug. 29]. Available from: https://www.symantec.com/blogs/threat-intelligence/powershell-threats-grow-further-and-operate-plain-sight). One method that cyber-criminals can use to avoid detection is so called obfuscation, meaning that the attacker code is re-written in a way to make it difficult to automatically detect its intent, but it runs as intended. This means that one of many ways to prevent cyber-attacks is to detect and remove obfuscated PowerShell-scripts, since the obfuscated scripts intent cannot be detected and hence not trusted.

A simulation of this situation in a small experiment shows how outlier detection in accordance with the present invention can detect previously unseen types of obfuscation when only trained on existing types.

Figure 7:
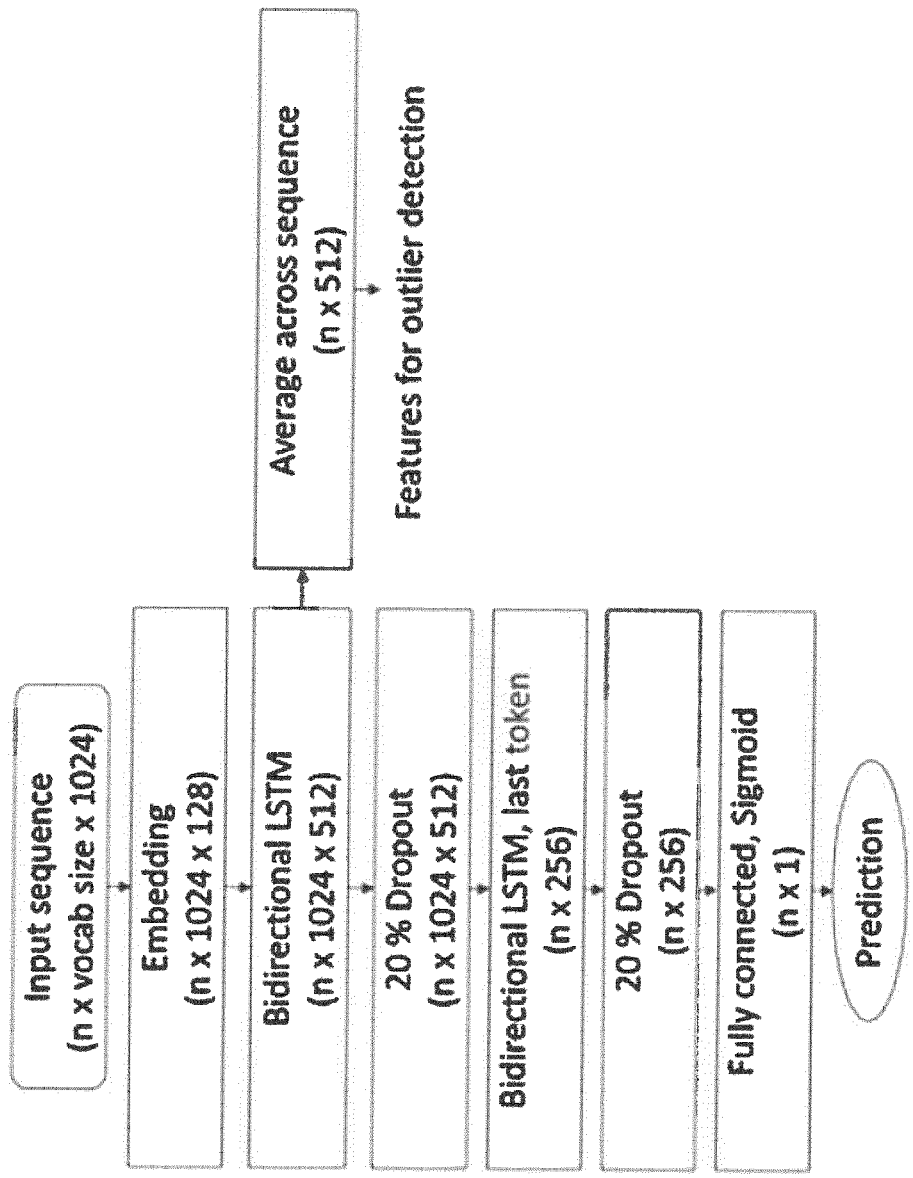
FIG. 7 shows an exemplary network architecture used for a predictive maintenance model to detect obfuscated PowerShell-scripts.

For this purpose a bidirectional LSTM-based binary classifier may be trained on sequences of single characters to classify approximately 400 000 PowerShell-scripts from PowerShellCorpus (assembled for Daniel Bohannon's Revoke-Obfuscation research https://github.com/danielbohannon/Revoke-Obfuscation) as obfuscated or not. An exemplary network architecture is shown in FIG. 7. To constitute obfuscated scripts, Daniel Bohannon's Invoke-Obfuscation v1.8 (https://github.com/danielbohannon/Invoke-Obfuscation) program String/1 or any other (manual or automated, random or pseudo-random or deterministic) obfuscation technique may be used on the regular scripts to create a new set of obfuscated scripts (hereon referred to as Obfuscation 1). For the purpose of demonstration, the model was trained for 5 epochs, using the Adam optimizer (Kingma D P, Ba J. Adam: A Method for Stochastic Optimization. ArXiv14126980 Cs [Internet]. 2014 Dec. 22 [cited 2018 Jul. 3]; Available from: http://arxiv.org/abs/1412.6980) with learning rate $10^{-2}$ the first three epochs, $10^{-3}$ the fourth and $10^{-4}$ minimizing the fifth minimizing a binary cross-entropy loss achieving 90.4% test set accuracy.

On inspection it can be noted that Obfuscation 1 is a very mild form of obfuscation, meaning that the resulting obfuscated scripts are often difficult to distinguish from regular scripts, leading to the conclusion that the achieved test set accuracy is reasonable and sufficient to show that the model has learned useful features to use for outlier detection.

To illustrate how to use deep learning-based outlier detection models to detect novel types of obfuscation, the results achieved by the method according to the present invention are compared to the results achieved by MC-Dropout. To constitute outliers, the Obfuscation 1-scripts was run through Invoke-Obfuscation Compression-program to create another set of obfuscated scripts (hereon referred to as Obfuscation 2). To do outlier detection features were collected from the first bi-directional LSTM layer and were averaged across the sequence (see FIG. 7) and PCA model capturing 99% of the variation of the original PowerShell scripts was fitted. Since it is known that it is searched for any deviation from regular PowerShell scripts, only regular scripts are used instead of all data used during model training. Then the residual sum of squares of regular scripts, Obfuscation 1 and Obfuscation 2 (shown in FIG. 8A, note log-scale on Y-axis) is calculated, respectively. It is noted that the distributions of RSS are distinctly different between regular scripts and Obfuscation 1 scripts meaning that when using a method according to the present invention for a model trained in a supervised way, one can reliably detect obfuscated scripts of both known and unknown types.

Figure 8B:
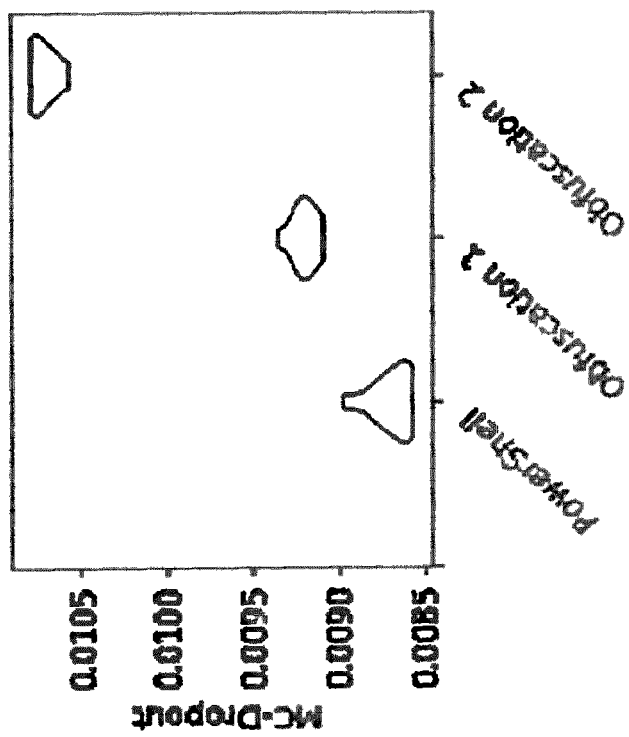
FIG. 8 shows violin plots of outlier distances metrics according to the present invention (FIG. 8A) and according to a comparative example using MC-dropout (FIG. 8B).
Figure 8A:
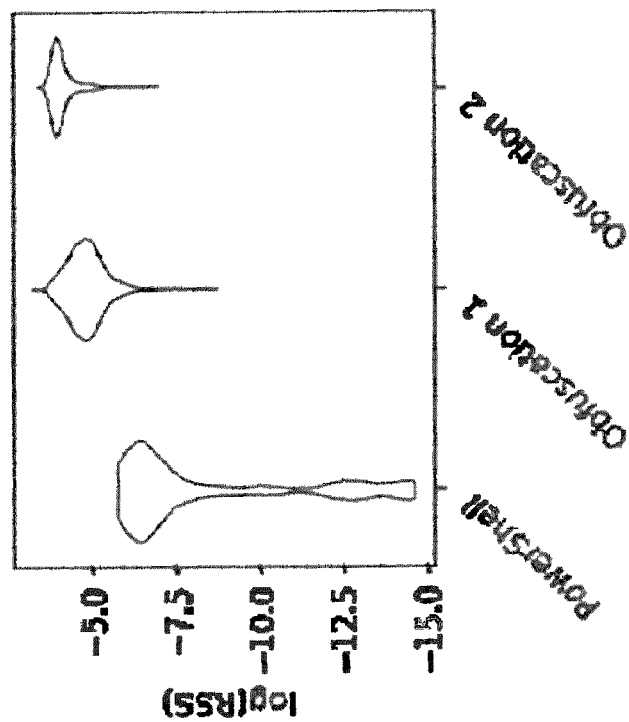

For comparison, MC-Dropout using 10 Monte Carlo-samples is run, reporting the standard deviation of prediction as outlier distance, which also achieves strong separation between regular scripts and obfuscated ones (see FIG. 8B). The big difference between the methodology according to the present invention and MC-Dropout is inference time. Even though, MC-Dropout shows stronger discrimination of unknown outliers in this example, the method according to the invention adds minimal overhead to the prediction time. In this example the method according to the invention adds approximately 1/30 of the wall-time required for prediction even though the prediction is GPU-accelerated, whereas outlier detection is not. In contrast does MC-Dropout require one full prediction per Monte Carlo-sample, meaning that in this example MC-Dropout takes 300 times longer compared to a method according to the invention. Although multiple Monte Carlo-samples can be run in parallel using batch processing, this introduces a trade-off between wall time for inference and hardware memory required for prediction.

FURTHER EXAMPLES

Another exemplary method for data analysis for an anomaly detection and/or predictive maintenance includes the following steps:

S101: Provided is a set of data (observations), for example historical sensor data of a piece of equipment with known faults or remaining life time. The provided observations constitute the training set.

S102: Train a deep neural network or fine-tune a pre-trained one. The deep neural network may be a convolutional neural network, recurrent neural network, recursive neural network, transformer neural network or any other suitable type of network.

S103: Choose one or more layers of the deep neural network and calculate the activations of the training set observations from that/those layers.

S103a: Optionally, if activations are from feature maps, which may be for example the case if the neural network is a convolutional neural network, apply global pooling across each feature map, for instance global average pooling.

S104: Fit a latent variable model on the (optionally pooled) training set activations.

S105: Use the latent variable model to calculate one or more set of distances of the training set observations.

S106: Select a threshold based on the distances of the training set observations, for instance $95^{th}$ percentile of training set distances (i.e. the distances obtained for the observations of the training set).

S107: Deploy the deep neural network. In other words, incorporate the deep neural network in a software used to detect anomalies or predict faults or remaining life-time. The software may be implemented as a stand-alone software, within the monitored equipment itself, on a central server (e.g. a central prediction or anomaly detection server) that may be deployed on premise or in a cloud environment, and/or on a computer network.

S108: Calculate the deep neural network predictions for the new observations.

S109: Decide if a specific new observation is an outlier observation by performing the following steps:

S109a: Calculate activations of the layer(s) used for fitting the latent variable model in S105. Optionally global pooling may be applied;

S109b: Use the activations from S109a and the latent variable model in S105 to calculate the distance(s) to the model;

S109c: Compare the distance(s) from S109b to the threshold distance from S106;

i. If the distance of S109c is greater than the threshold in S106, the new observation is considered an outlier. Application-specific action is subsequently taken. For instance, the end user may be warned to analyze the outlier manually before proceeding. The deep neural network prediction from S108 may be ignored and the outlier observation discarded.

ii. If the distance of S109c is not greater than the threshold in S106, the new observation is not considered an outlier and the prediction from S108 is accepted.

An exemplary predictive maintenance system may include the following components:

The predictive maintenance system may include data-collecting sensors to measure the state of the entity of interest such as at least one piece of equipment. The sensors may include physical sensors measuring for example temperature, pressure, current, flux, etc. Sensors may also be so called soft sensors where the state of the equipment is calculated indirectly based on physical measurements, example soft sensors include Kalman filters or velocity estimators. Sensors may also collect structured data or unstructured data in the form of audio or images.

The predictive maintenance system may further comprise a data communication network and respective data communication units allowing data transfer from the sensors, for example to a data store and/or other units. In some examples the data transfer may be in real-time. In some examples the data transfer may include a wireless transfer.

The predictive maintenance system may further comprise a data store (e.g. a database) where collected data from the sensors and optionally other data is accumulated, processed and/or analyzed. The data store may be implemented as an on-premise server, distant server or a distributed cloud service.

The predictive maintenance system may further comprise a predictive analytics component (predictive analytics unit) configured to carry out the method described herein. The predictive analytics component may constitute or be a part of a control and/or analysis system 30 depicted in FIG. 1. In particular, the predictive analytics component may be configured to aggregate and model the collected data to predict when maintenance is required, an imminent security breach, a fraudulent transaction or user, etc. The predictive analytics component may be run directly on the observed piece of equipment or system, constituting so called edge analytics. The predictive analytics component may also be run on a server or as a cloud service.

The predictive maintenance system may further optionally comprise a user interface, that for instance an operator can use to gain insight in the equipment state and/or start. The user interface may be, for example, a graphical user interface.

Variations

In some of the above examples, a convolutional neural network (CNN) was used. However, the deep neural network 100 is not restricted to a convolutional neural network, but may be any type of neural network, for example recurrent neural network, recursive neural network, transformer neural network, etc.

In some of the above examples, activations from a single hidden layer are used for performing the outlier detection.

In some other examples, activations from two or more hidden layers may be used for performing the outlier detection. For instance, in order to avoid the difficulty in selecting which layer to use for outlier detection, the measures from all (hidden) layers may be combined using Gaussian Kernel Density estimation, which have been used to detect outliers (see e.g., L. J. Latecki, A. Lazarevic, and D. Pokrajac, "Outlier Detection with Kernel Density Functions," in Machine Learning and Data Mining in Pattern Recognition, 2007, pp. 61-75; E. Schubert, A. Zimek, and H. Kriegel, "Generalized Outlier Detection with Flexible Kernel Density Estimates," in Proceedings of the 2014 SIAM International Conference on Data Mining, 0 vols., Society for Industrial and Applied Mathematics, 2014, pp. 542-550). Kernel density estimations can be calculated separately for training set Mahalanobis-distances and residual sum of squares, but combining all layers. The probabilities of each observation can be approximated under the resulting kernel density functions using Monte Carlo integration. The outlier detection performance can be evaluated in the same manner as in the experiments described above.

In further examples, when integrating several embeddings (e.g., activations from several layers) a bagging approach (see e.g., A. Lazarevic and V. Kumar, "Feature Bagging for Outlier Detection," in Proceedings of the Eleventh ACM SIGKDD International Conference on Knowledge Discovery in Data Mining, New York, NY, USA, 2005, pp. 157-166) may be used instead of direct kernel density.

Further, it may be possible to use other methodologies on learned representations, GMM one-class SMV, clustering, etc.

Further, in various embodiments and examples described herein, instead of using simple measure such as Mahalanobis distance, a more localized measures such as Local Outlier Factor or LOF (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104) may be applied directly in PCA space. In principle, any suitable distance metric or a combination of distance metrics may be used, such as compound metric Distance to Modelled Embedding, sum of squares, Local Outlier Factor, etc.

In some of the above examples, specific images are used as observations (both as a part of the training set and as new observations for which a prediction is to be obtained). As described above, instead of these images any other images may be used, for example images of a piece of equipment, machine component, etc. on the basis of which a fault, degradation, breach of integrity or security or any other deviation from the normal state or operation of the observed entity (i.e. anomaly) may be determined.

For example, based on characteristics of the obtained images, such as the presence of certain features, level of corruption of the images, changes in the color of the obtained images, etc., an anomaly of the imaged object(s) and/or the imaging system may be determined. The anomalies of the imaged objects may for example include faults (e.g. cracks), wear or degradation of the imaged object(s). Further, the presence of image defects or image corruption may be indicative of defects, misalignment, etc. of the imaging system. For example, an image may be corrupted at least partially due to an interruption of the writing process during image writing, faults in the focusing system of the image capturing device, Upon detecting of such anomalies the user may be informed respectively and/or a corrective maintenance action may be initiated.

Further, instead of images, other types of input data may be used, for example data obtained based on measurements of one or more sensors, computer network traffic data, transactional data (e.g. relating to financial transactions), etc. In principle any type of data that characterizes the observed piece of equipment or system may be processed. The method according to the various embodiment and examples described herein may be then used to distinguish between normal behavior and known types of anomalies as well as to flag unknown types of anomalies as well.

Further, there may be various applications of the methods and systems as described herein. One of the possible applications is for detection of anomalies in images obtained by phase microscopy. The task of identifying nuclei from phase contrast images is challenging and typically relies on fluorescent markers binding to nuclei to provide an extra image channel highlighting locations of nuclei. By applying deep CNN:s, a model may be generated and trained that segments background from cells as well as identifies nuclei of cells from phase contrast images without using fluorescence labels. If the CNN is trained on phase contrast images from multiple cell types, the CNN may also identify new previously unseen cell types that may be regarded as anomalies. In order to determine when unseen cell types are too different from the cell types used for CNN training, prediction time outlier detection may be applied. If phase microscopy images from new cell types are detected as outliers, the user may receive a warning that anomalies are detected and/or that the CNN:s separation of cell and background as well as detection of nuclei are unreliable. In this case, the CNN system provided may send a signal that the CNN model needs to be re-trained in order to reliably separate cells from background and identify nuclei from phase contrast images for the new cell type.

A further application is anomaly detection in various types of technical systems, such as machine components, machines, industrial plants, power plants, etc.

For example, in predictive maintenance equipment can be measured in real-time typically using physical sensors. A predictive deep learning-model can then be used to detect and classify errors before they occur. The method and system as described herein provide the possibility to detect errors of unknown type in addition to known ones, the errors of unknown type being reliably identified as outliers. Based on the results, it may be automatically determined when a piece of equipment require maintenance to avoid breakage. Accordingly, the predictive maintenance system may have a defined behavior even in the event of previously unknown fault types. Thus, significant cost savings can be achieved and the risk that the equipment fails earlier than expected potentially leading to catastrophic failure or to the stop of the process may be reduced.

Another example is in the technical field of cyber security, for example for detecting network intrusion. For example, by using deep learning to model network traffic, i.e. logs of data packages transferred between different computers on the network, subtle changes in traffic patterns indicative of malicious actors in the network may be detected and classified as intrusion. By using the proposed method and a system the used deep learning mode can also warn when there are previously not seen patterns, as such patterns are reliably identified as outliers.

Another example is in the field of financial transactions (e.g. banking). In a financial computer network, economic transactions may be characterized for example by when/where/how much money is transferred between actors. Using historical data, deep learning-based classifiers may be trained to classify a transaction or actors as fraudulent. Using the invention, the deep learning model can warn when a new type of fraudulent transaction occurs or when an actor behaves in a previously unseen way. Thus, the security of a financial computer network may be improved.

In the above examples, the historical data may be used to characterize the studied system whatever it may be and to train the deep learning neural network (deep learning model). The deep learning-model may be then used to distinguish between normal behavior and known types of anomalies. In addition, the proposed method and system add the possibility to identify unknown types of anomalies as well.

Hardware Configuration

Figure 9:
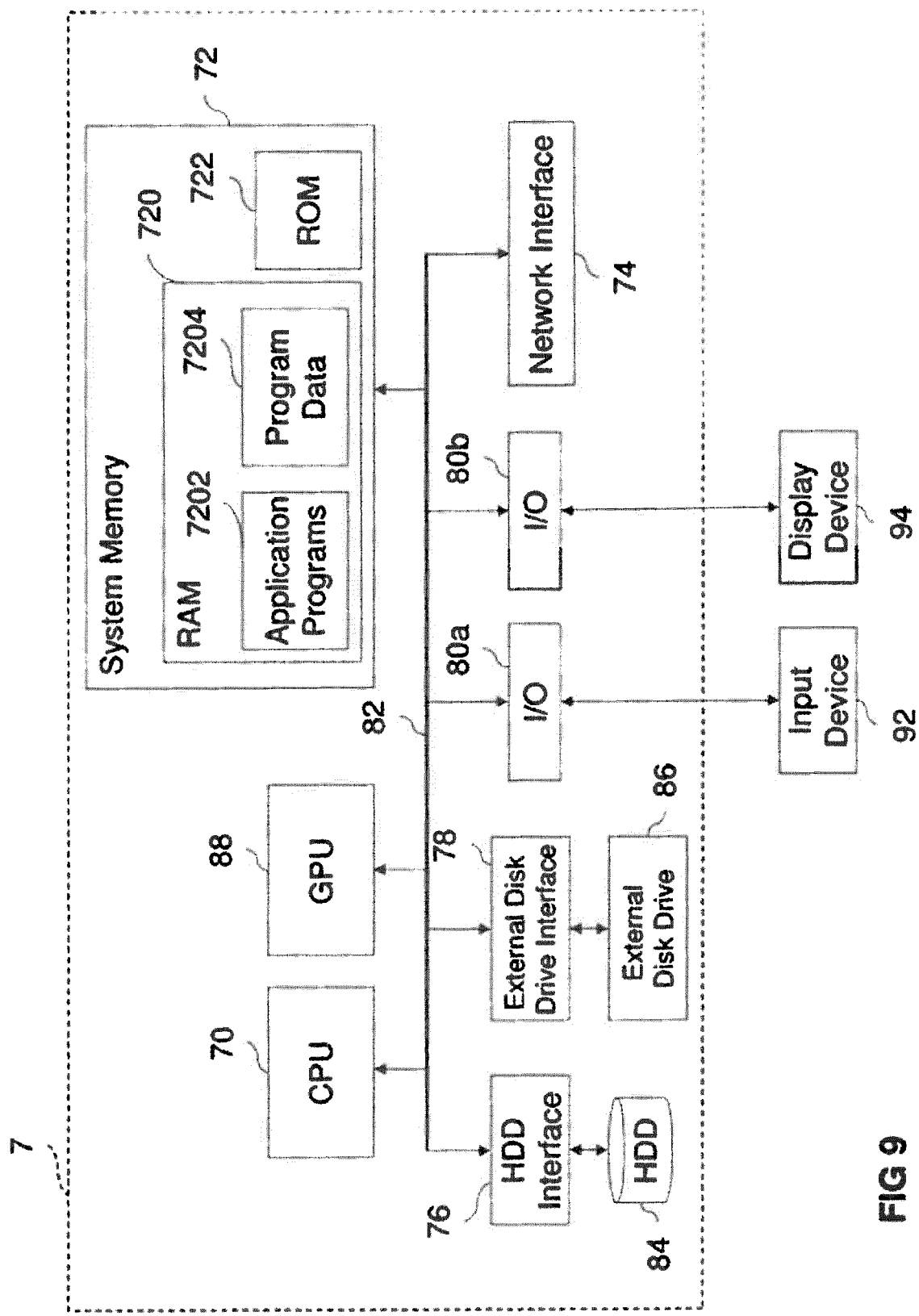
FIG. 9 shows an exemplary hardware configuration of a computer that may be used to implement at least a part of the system described herein.

FIG. 9 shows an exemplary hardware configuration of a computer that may be used to implement at least a part of the computing system 1 and/or perform the method as described above. For example, the computer may implement a predictive analytics component described above. The computer 7 shown in FIG. 9 includes a central processing unit (CPU) 70, a graphics processing unit (GPU) 88, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The GPU 88 may perform processing concerning graphic images and/or matrix operations required for deep learning. The GPU 88 may comprise a plurality of processors (e.g. cores) that can perform parallel processing, which may lead to higher performance of the computing system 1. The CPU 70 and/or GPU 88 may implement the processors of the exemplary devices and/or system described above. In some examples, however, the computer 7 does not necessarily comprise the GPU 88. The system memory 72 may store information and/or instructions for use in combination with the CPU 70. The system memory 72 may include volatile and non-volatile memory, such as a random access memory (M) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures. The CPU 70 may be further connected to one or more sensors (not shown) via one or more corresponding interfaces (not shown) and the bus 82. The sensors may measure physical conditions or states including but not limited to: temperature, pH, pressure, etc. Additionally, the sensors may include other types of measuring or detecting devices including but not limited to imaging devices, microphones, spectral sensors, etc. Controllers may control a physical condition or state including but not limited to: temperature, flux, stirring, etc.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 9, the computer 7 may further be connected to a printer and/or an imaging device such as a camera, via corresponding I/O interfaces and the system bus 82.

In addition or as an alternative to an implementation using a computer 7 as shown in FIG. 9, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

Glossary

ASIC Application Specific Integrated Circuit
BIOS basic input/output system
CD ROM Compact Disc Read-Only Memory
CNN convolutional neural network
CPU central processing unit
DNN deep neural network
GPU graphics processing unit
FPGA Field Programmable Gate Array
HDD hard disk drive
HTTP hypertext transfer protocol
I/O input/output
LSI Large Scale Integration
LOF Local Outlier Factor
MC-dropout Monte Carlo dropout
MNIST Modified National Institute of Standards and Technology
PCA Principal Component Analysis
RAM random access memory
ReLu/Relu rectified linear unit
RISC Reduced Instruction Set Circuits
ROC-AUC Receiver-Operating-Characteristic Area-Under-Curve
ROM read only memory
RSS residual sum of squares
SSH Secure Shell

The invention claimed is:

1. A computer-implemented method for anomaly detection in an entity of interest comprising:
receiving a new observation said new observation characterizing at least one parameter of the entity;
inputting the new observation to a deep neural network (100), the deep neural network (100) having a plurality of hidden layers and being trained using a training dataset that includes possible observations that can be input to the deep neural network (100);
obtaining a second set of intermediate output values that are output from at least one of the plurality of hidden layers of the deep neural network (100) by inputting the received new observation to the deep neural network (100);
mapping, using a latent variable model stored in a storage medium, the second set of intermediate output values to a second set of projected values;
determining whether or not the received new observation is an outlier with respect to the training dataset based on the latent variable model and the second set of projected values,
calculating, by the deep neural network (100), a prediction for the new observation; and
determining a result indicative of the occurrence of at least one anomaly in the entity based on the prediction and the determination whether or not the new observation is an outlier;
wherein the latent variable model stored in the storage medium is constructed by:
obtaining first sets of intermediate output values that are output from said one of the plurality of hidden layers of the deep neural network (100), each of the first sets of intermediate output values obtained by inputting a different one of the possible observations included in at least a part of the training dataset; and
constructing the latent variable model using the first sets of intermediate output values, the latent variable model providing a mapping of the first sets of intermediate output values to first sets of projected values in a sub-space of the latent variable model that has a dimension lower than a dimension of the sets of the intermediate output values.

2. A computer-implemented method according to claim 1, further comprising:
obtaining the deep neural network (100) for processing data and at least a part of a training dataset used for training the deep neural network (100), the deep neural network comprising a plurality of hidden layers and being trained by using the training dataset, the training dataset including a plurality of possible observations that can be input to the deep neural network;

obtaining first sets of intermediate output values that are output from at least one of the plurality of hidden layers, each of the first sets of intermediate output values obtained by inputting a different one of the possible observations included in said at least a part of the training dataset;

constructing or fitting a latent variable model using the first sets of intermediate output values, the latent variable model providing a mapping of the first sets of intermediate output values to first sets of projected values in a sub-space that has a dimension lower than a dimension of the sets of the intermediate output values; and storing the latent variable model and the first sets of projected values in a storage medium.

3. The method according to claim 1, wherein said step of determining whether or not the received new observation is an outlier comprises:

determining a distance of the second set of projected values with respect to a distribution of the first sets of projected values; and determining that the received new observation is an outlier with respect to the training dataset if the calculated distance is larger than a threshold value for the determined distance.

4. The method according to claim 3, wherein the threshold value for the distance is determined based on distances, each of which being calculated for a different one of the first sets of projected values with respect to the distribution of the first sets of projected values.

5. The method of claim 3, wherein the distance is one of a compound distance, residual sum of squares, Mahalanobis distance or Local Outlier Factor.

6. The method according to claim 1, wherein said step of determining whether or not the received new observation is an outlier comprises:

determining an approximate set of intermediate output values corresponding to the second set of intermediate output values, using the latent variable model and the second set of projected values;

calculating a squared approximation residual for the second set of intermediate output values and the approximate set of intermediate output values; and determining that the received new observation is an outlier with respect to the training dataset if the calculated squared approximation residual is larger than a threshold value for the squared approximation residual.

7. The method according to claim 6, wherein the threshold value for the squared approximation residual is determined based on squared approximation residuals, each of which is calculated for a different one of the first sets of intermediate output values and an approximate set of intermediate output values corresponding to said one of the first sets of intermediate output values.

8. The method according to claim 1, wherein the steps of obtaining the first sets of intermediate output values and constructing the latent variable model are performed for two or more of the plurality of hidden layers;

wherein the steps of obtaining the second set of intermediate output values and mapping the second set of intermediate output values to the second set of projected values are performed concerning said two or more of the plurality of hidden layers; and wherein, the step of determining whether or not the received new observation is an outlier is performed based on the latent variable model and the second sets of projected values obtained concerning said two or more of the plurality of hidden layers.

9. The method according to claim 1, wherein the step of obtaining the intermediate output values that are output from at least one of the plurality of hidden layers of the deep neural network (100) comprises determining activations from the at least one of the plurality of hidden layers and optionally applying a global pooling on the determined activations.

10. The method according to claim 1, wherein the latent variable model is constructed according to principal component analysis or using an autoencoder.

11. A method according to claim 1, wherein the observations are obtained based on physical measurements by one or more sensors.

12. A computer-implemented method for predictive maintenance of an entity, the method comprising:

obtaining a new observation based on sensor data from at least one sensor measurement performed on the entity;

determining a result indicative of the occurrence of at least one anomaly in the entity according to the method of claim 1; and determining whether a corrective action should be taken and optionally, the type of the corrective action to be taken based on the result indicative of the occurrence of at least one anomaly.

13. A computer program product comprising computer-readable instructions embodied on one or more non-transitory computer-readable media that, when loaded and run on a computer, cause the computer to perform a method for anomaly detection in an entity of interest, the method comprising:

receiving a new observation said new observation characterizing at least one parameter of the entity;

inputting the new observation to a deep neural network, the deep neural network having a plurality of hidden layers and being trained using a training dataset that includes possible observations that can be input to the deep neural network;

obtaining a second set of intermediate output values that are output from at least one of the plurality of hidden layers of the deep neural network by inputting the received new observation to the deep neural network;

mapping, using a latent variable model stored in a storage medium, the second set of intermediate output values to a second set of projected values;

determining whether or not the received new observation is an outlier with respect to the training dataset based on the latent variable model and the second set of projected values, calculating, by the deep neural network, a prediction for the new observation; and determining a result indicative of the occurrence of at least one anomaly in the entity based on the prediction and the determination whether or not the new observation is an outlier;

wherein the latent variable model stored in the storage medium is constructed by:

obtaining first sets of intermediate output values that are output from said one of the plurality of hidden layers of the deep neural network, each of the first sets of intermediate output values obtained by inputting a different one of the possible observations included in at least a part of the training dataset; and constructing the latent variable model using the first sets of intermediate output values, the latent variable model providing a mapping of the first sets of intermediate output values to first sets of projected values in a sub-space of the latent variable model that has a dimension lower than a dimension of the sets of the intermediate output values.

14. A system for anomaly detection or predictive maintenance of an entity, the system comprising:
a data acquisition unit for obtaining one or more observations characterizing at least one parameter of the entity;
a storage medium (12) storing a training dataset used for training a deep neural network (100), the deep neural network (100) comprising a plurality of hidden layers and being trained using the training dataset, the training dataset including possible observations that can be input to the deep neural network (100); and
a predictive analytics unit comprising at least one processor configured to perform a method for anomaly detection in an entity of interest, the method comprising:
receiving a new observation, said new observation characterizing the at least one parameter of the entity;
inputting the new observation to the deep neural network;
obtaining a second set of intermediate output values that are output from at least one of the plurality of hidden layers of the deep neural network by inputting the received new observation to the deep neural network;
mapping, using a latent variable model stored in a storage medium, the second set of intermediate output values to a second set of projected values;
determining whether or not the received new observation is an outlier with respect to the training dataset based on the latent variable model and the second set of projected values,
calculating, by the deep neural network, a prediction for the new observation; and
determining a result indicative of the occurrence of at least one anomaly in the entity based on the prediction and the determination whether or not the new observation is an outlier;
wherein the latent variable model stored in the storage medium is constructed by:
obtaining first sets of intermediate output values that are output from said one of the plurality of hidden layers of the deep neural network, each of the first sets of intermediate output values obtained by inputting a different one of the possible observations included in at least a part of the training dataset; and
constructing the latent variable model using the first sets of intermediate output values, the latent variable model providing a mapping of the first sets of intermediate output values to first sets of projected values in a sub-space of the latent variable model that has a dimension lower than a dimension of the sets of the intermediate output values.

15. The system according to claim 14 further comprising:
at least one sensor for measuring at least one parameter of the entity; and
a data communication unit for data transfer between the at least one sensor and the data acquisition unit and/or the at least one processor.

* * * * *